(12) United States Patent
Gaudet et al.

(10) Patent No.: US 11,016,259 B2
(45) Date of Patent: May 25, 2021

(54) APPARATUS AND METHOD FOR ADHERING A FILAMENT TO A SURFACE

(71) Applicant: Atomic Energy Of Canada Limited / Énergie Atomique, Chalk River (CA)

(72) Inventors: Michel Gaudet, Pembroke (CA); Metin Yetisir, Deep River (CA); Wenhai Li, Nepean (CA)

(73) Assignee: Atomic Energy Of Canada Limited / Energie Atomique Du Canada Limitee, Chalk River (CA)

( * ) Notice: Subject to any disclaimer, the term of this patent is extended or adjusted under 35 U.S.C. 154(b) by 0 days.

(21) Appl. No.: 16/312,488

(22) PCT Filed: Jul. 6, 2017

(86) PCT No.: PCT/CA2017/050815
§ 371 (c)(1),
(2) Date: Dec. 21, 2018

(87) PCT Pub. No.: WO2018/006173
PCT Pub. Date: Jan. 11, 2018

(65) Prior Publication Data
US 2019/0146175 A1    May 16, 2019

Related U.S. Application Data

(60) Provisional application No. 62/359,472, filed on Jul. 7, 2016.

(51) Int. Cl.
| G02B 6/46 | (2006.01) |
| G01D 11/00 | (2006.01) |
| G01D 5/26 | (2006.01) |

(52) U.S. Cl.
CPC ............. *G02B 6/46* (2013.01); *G01D 5/268* (2013.01); *G01D 11/00* (2013.01)

(58) Field of Classification Search
CPC ........ G02B 6/46; G02B 6/4463; G01D 11/00; G01D 5/268
See application file for complete search history.

(56) References Cited

U.S. PATENT DOCUMENTS 4,978,413 A * 12/1990 Schotter .................. B05C 3/15
118/125
5,902,435 A    5/1999 Meis et al.
(Continued)

FOREIGN PATENT DOCUMENTS

| DE | 19533766 | 10/1996 |
| DE | 19921382 | 8/2000 |

(Continued)

OTHER PUBLICATIONS

IPRP issued in related PCT/CA2017/050815, dated Jan. 17, 2019.
Supplementary European Search Report in EP 17823377 dated Feb. 12, 2020.

*Primary Examiner* — Vishal I Patel
(74) *Attorney, Agent, or Firm* — Kevin Shipley; Fogler, Rubinoff LLP

(57) ABSTRACT

An apparatus for adhering a filament to a surface can include a body having a filament inlet port, at least a first filament outlet port spaced apart from the filament inlet port, and at least a first filament travel path extending between the filament inlet port and the first filament outlet port. A reservoir chamber can form a portion of the first filament travel path between the filament inlet port and the first filament outlet port and can contain a viscous adhesive material. Imparting relative axial movement between the body and a first filament can urge the first filament along the first filament travel path and through the reservoir chamber so that the first filament is coated with the viscous adhesive material when exiting via the first filament outlet port, for adhesion to the surface.

13 Claims, 20 Drawing Sheets

(56) References Cited

U.S. PATENT DOCUMENTS

| | | |
|---|---|---|
| 2013/0020015 A1 | 1/2013 | Dickinson |
| 2013/0228274 A1* | 9/2013 | Sidhu .................. G02B 6/3612 156/280 |
| 2014/0171821 A1 | 6/2014 | Govari |
| 2016/0124150 A1 | 5/2016 | Todd |

FOREIGN PATENT DOCUMENTS

| | | |
|---|---|---|
| WO | 2009106576 A1 | 9/2009 |
| WO | 2015090601 | 6/2015 |

* cited by examiner

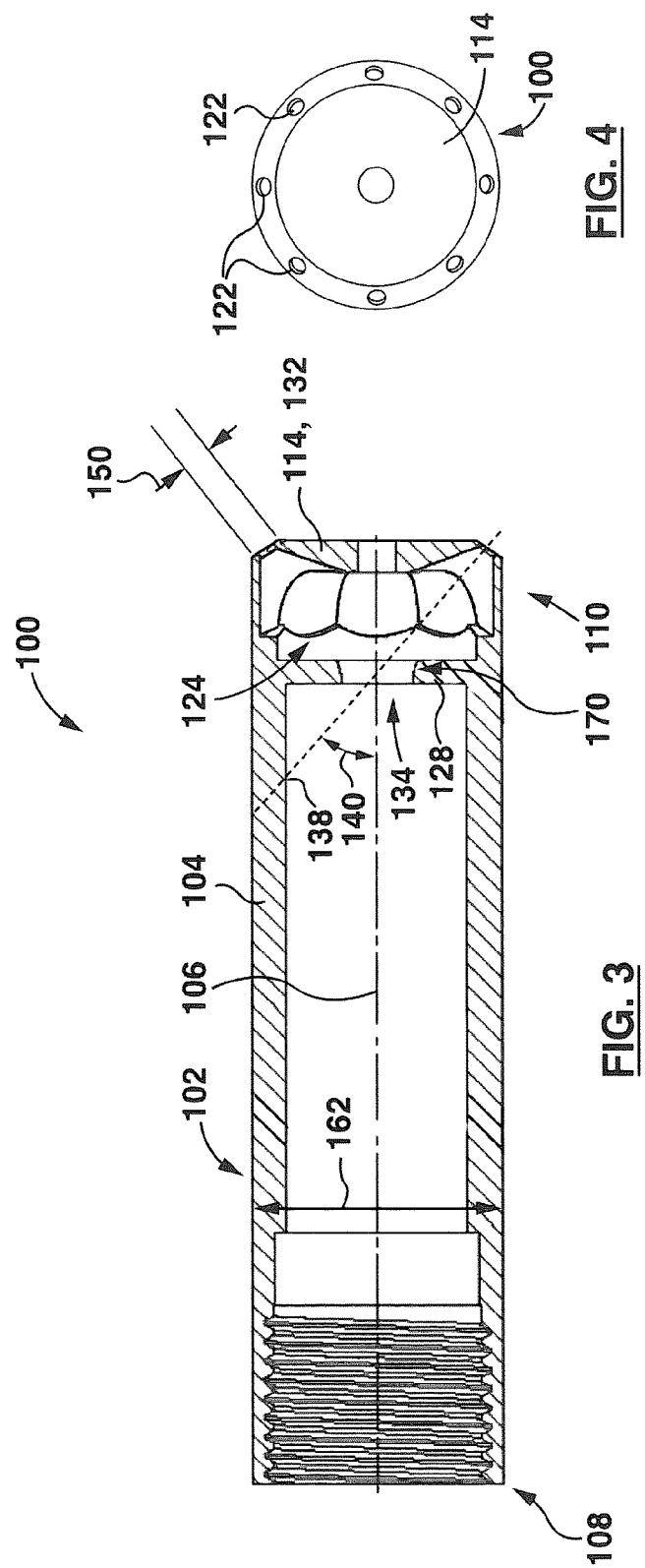

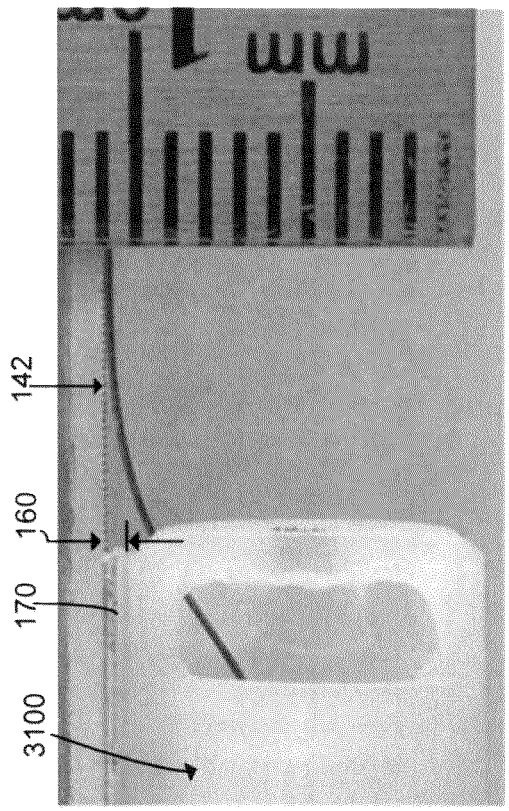
FIG. 13C
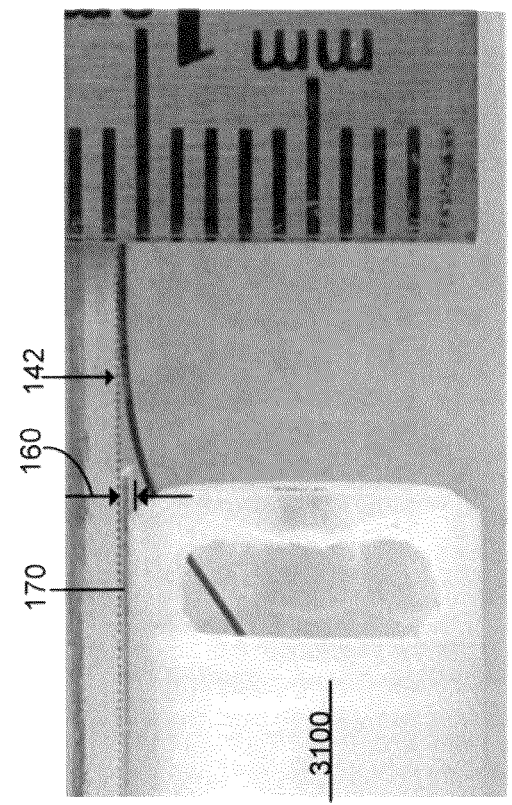
FIG. 13D
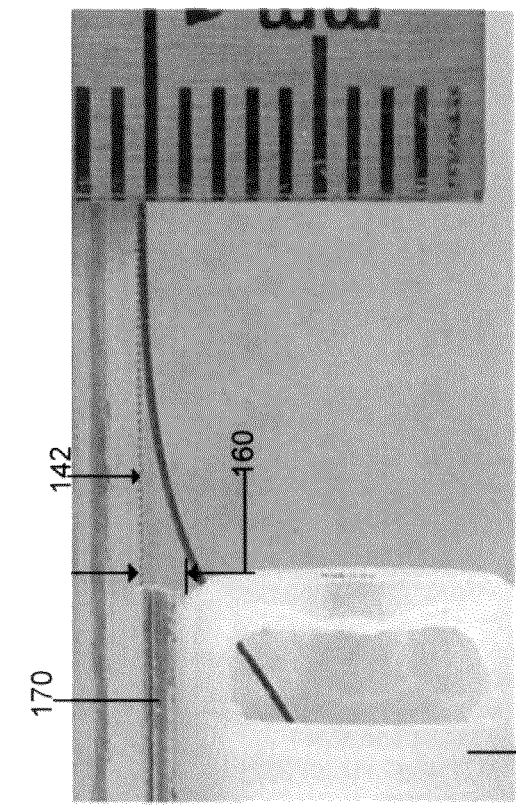
FIG. 13E
FIG. 13F

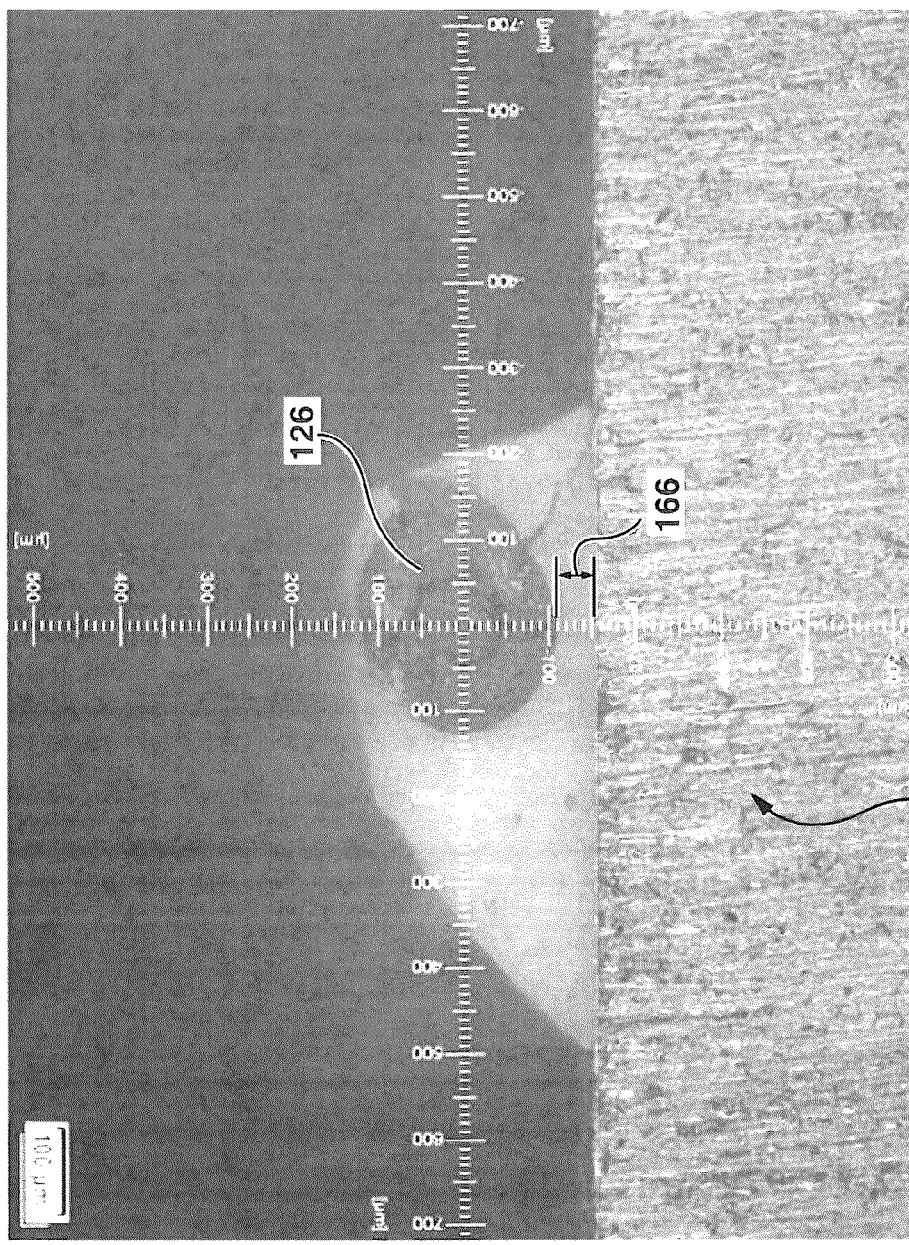

APPARATUS AND METHOD FOR ADHERING A FILAMENT TO A SURFACE

CROSS REFERENCE TO RELATED APPLICATIONS

This application claims the benefit U.S. Provisional Application No. 62/359,472 filed Jul. 7, 2016 and entitled Apparatus and Method for Adhering a Filament to a Surface, the entirety of which is incorporated herein by reference.

FIELD

The present disclosure relates generally installation of filaments, and in particular, adhering a filament to a surface.

INTRODUCTION

Fiber optic sensors can be bonded, or adhered, to a surface manually. Techniques include placing the fiber in the desired location and temporarily restraining the fiber with adhesive tape or discrete adhesive dots. Adhesive is then manually applied over the surface using brushes, swabs, or dispensers such as syringes or glue guns. After the adhesive is applied, mechanical pressure may be applied to bond the fiber with the surface. Mechanical pressure may be applied by pressing with a fingertip or soft tool. Such steps require the surface to be accessible and visible.

Manual techniques for adhering fibers to a surface can result in variations along the length of the installation. Manual techniques can be time consuming as a single fiber is adhered to the surface at a time. In addition, the adhesion may depend at least in part on the skill of the technician.

SUMMARY

The following paragraphs are intended to introduce the reader to the detailed description that follows and not to define or limit the claimed subject matter. Furthermore, the following paragraphs are not an admission that anything discussed in them is prior art or part of the knowledge of persons skilled in the art.

According to one broad aspect of the teachings described herein, an apparatus for adhering a plurality of filaments to an inner surface of a hollow conduit, may include a body having a filament inlet port, a plurality of filament outlet ports spaced apart from the filament inlet port, and a plurality of filament travel paths. Each filament travel path may extend between the filament inlet port and a respective one of the plurality of filament outlet ports. A reservoir chamber may be positioned within the body and may form a portion of each of the plurality of filament travel paths between the filament inlet port and each of the plurality of filament outlet ports. The reservoir chamber may be to contain a viscous adhesive material. Imparting relative axial movement between the body and the plurality of filaments extending through the plurality of filament travel paths may urge the filaments along the filament travel path and through the reservoir chamber so that each filament is coated with the viscous adhesive material when exiting via a respective one of the filament outlet ports, for adhesion to the inner surface.

The body may be substantially cylindrical and may extend along a body axis. The plurality of filament outlet ports may be spaced apart from each other and arranged around the body axis.

The apparatus may also include at least one filament guide provided along each filament travel path and within the reservoir chamber to guide each filament to exit the filament outlet port along a respective outlet port axis that is inclined relative to the body axis at an angle of between about 30 degrees and about 45 degrees.

According to another broad aspect of the teachings described herein, an apparatus for adhering a filament to a surface can include a body extending along a body axis, and a reservoir chamber positioned within the body. The body can have a filament inlet port, at least a first filament outlet port spaced apart from the filament inlet port, and at least a first filament travel path extending between the filament inlet port and the first filament outlet port. The reservoir chamber can form a portion of the first filament travel path between the filament inlet port and the first filament outlet port, The reservoir chamber can be configured to contain a viscous adhesive material. Imparting relative axial movement between the body and a first filament extending through the first filament travel path can urge the first filament along the first filament travel path and through the reservoir chamber so that the first filament is coated with the viscous adhesive material when exiting via the first filament outlet port.

The reservoir chamber can include a reservoir inlet port through which a filament can enter the reservoir. The reservoir chamber can also include at least a first reservoir outlet port spaced apart from the reservoir inlet port through which the filament can exit the reservoir chamber.

The reservoir inlet port can be axially spaced apart from the filament inlet port. The first reservoir outlet port can comprise the first filament outlet port.

The first reservoir outlet port can be axially spaced apart from the reservoir inlet port. The first reservoir outlet port can be offset from the reservoir inlet port in a lateral direction that is transverse to the body axis.

The body axis can intersect the filament inlet port. The first filament outlet port can be offset from the body axis in a lateral direction that is transverse to the body axis.

The body can comprise at least a first end wall and a sidewall that extends axially from the first end wall. The filament outlet port can be disposed in the sidewall.

The filament outlet port can extend along an outlet port axis. The outlet port axis can be inclined relative to the body axis at an angle of between about 10 degrees and about 75 degrees.

The outlet port axis can be inclined relative to the body axis at an angle of between about 30 degrees and about 45 degrees.

The apparatus may also include at least one filament guide provided in the first filament travel path between the fiber inlet port and the first filament outlet port to urge the filament into a particular orientation relative to the apparatus, wherein the filament guide is axially offset from the first filament outlet port.

The outlet port axis may intersect the filament guide and the first filament outlet port.

The filament guide may be disposed within the reservoir chamber.

The body may be substantially cylindrical.

The apparatus can also include a second filament outlet port that is spaced apart from the first filament outlet port and a second filament travel path extending between the filament inlet port and the second filament outlet port and extending through the reservoir chamber. Imparting relative axial movement between the body and a second filament extending through the second filament travel path can urge the second filament along the second filament travel path and through the reservoir chamber so that second filament is coated with the viscous adhesive material when exiting via the second filament outlet port.

The reservoir inlet port can be sized to slidably receive the first filament in a non-sealed manner. The first filament can physically contact less than 100% of a perimeter of the reservoir inlet port.

The reservoir inlet port can have an inlet port diameter that is at least 5% larger than a diameter of the first filament.

The first reservoir outlet port can have an outlet port diameter that is at least 5% larger than a diameter of the first filament.

The reservoir chamber can include an adhesive inlet port that is in communication with the reservoir chamber through which adhesive material can be deposited into the reservoir chamber. The adhesive inlet port can be spaced apart from the reservoir inlet port and the first reservoir outlet port.

The adhesive inlet port can be sealed by an openable plug.

The adhesive inlet port can be disposed in a first end wall of the body.

The reservoir chamber can be disposed toward a first end of the body. The reservoir chamber can be at least partially bounded by a first end wall of the body and a sidewall extending axially from the first end wall.

Optionally, the filament may be an optical fiber, a wire, a cable any the like.

According to another broad aspect of the teachings described herein, a method of simultaneously adhering a plurality filaments to a surface using an apparatus can include the steps of: a) inserting a plurality of filaments into respective an inlet port on a body portion of the apparatus, the body portion comprising a reservoir chamber containing a viscous adhesive material, b) translating the apparatus relative to the surface and the plurality of filaments so that the plurality of filaments are simultaneously drawn through the reservoir chamber and coated with the viscous adhesive material; c) simultaneously extracting each of the adhesive-coated plurality of filaments through a plurality of filament outlet ports on the body portion downstream from the reservoir chamber; and d) placing a bonding side of each of the adhesive-coated plurality of filaments exiting the plurality of filament outlet ports onto the surface whereby the viscous adhesive material adheres each of the plurality to the surface.

According to another broad aspect of the teachings described herein, a method of adhering a filament to a surface using an apparatus can include the steps of a) inserting a first filament into a filament inlet port on a body portion of the apparatus. The body portion can include a reservoir chamber containing a viscous adhesive material. The method can also include the steps of b) translating the apparatus relative to the surface and first filament so that the first filament is drawn through the reservoir chamber and coated with the viscous adhesive material; c) extracting the adhesive-coated first filament through a first filament outlet port on the body portion downstream from the reservoir chamber; and d) placing a bonding side of the adhesive-coated first filament exiting the first filament outlet port onto the surface such that the viscous adhesive material adheres the first filament to the surface.

The method can also include the step of removing at least a portion of the viscous adhesive material from the bonding side of the filament as the filament exits through the filament outlet port so that the bonding side is coated with less adhesive material than an opposing outer side of the filament.

The filament can exit the filament outlet port traveling along an outlet port axis that is inclined relative to the surface so that the filament bends between the filament outlet port and the surface. A natural resilience of the filament can urge the bonding side of the filament against the surface.

The method can also include the steps of: a) inserting a second filament into the filament inlet port; b) translating the apparatus relative to the surface and second filament so that the second filament is drawn through the reservoir chamber in unison with the first filament and is coated with the viscous adhesive material; c) extracting the adhesive-coated second filament through a second filament outlet port on the body portion downstream from the reservoir chamber; and d) placing a bonding side of the adhesive-coated second filament exiting the second filament outlet port onto the surface whereby the viscous adhesive material adheres the second filament to the surface.

The method may include the step of bonding the apparatus to the surface to which the first filament is bonded and to the first filament.

The method may include the step of directing the first filament toward the first filament outlet port at a first outlet angle that is between about 10 degrees and about 75 degrees using a filament guide disposed within the reservoir chamber.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings:

FIG. 3 is side view of the cross-section of FIG. 2;

FIG. 4 is an end view of the apparatus of FIG. 1;

FIGS. 13B-13F are side views of another example of a fiber applied by an apparatus offset different distances from the surface;

FIG. 20 is a cross-sectional view of another example of a filament applied to a surface.

Figure 1:
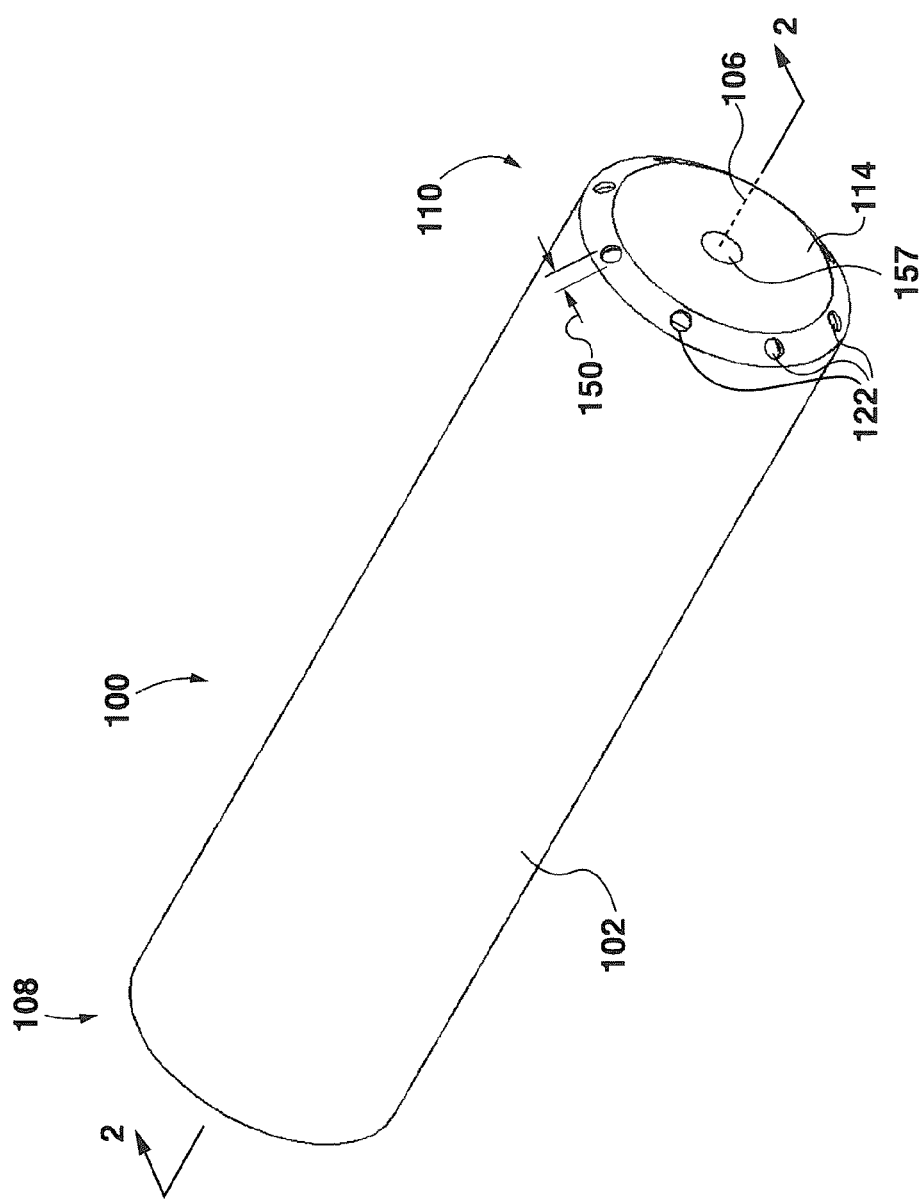
FIG. 1 is a perspective view of one example of an apparatus for adhering a fiber to a surface.

Elements shown in the figures have not necessarily been drawn to scale. Further, where considered appropriate, reference numerals may be repeated among the figures to indicate corresponding or analogous elements.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

The present disclosure is directed to an apparatus and method to adhere a filament to a surface. To help install filaments in locations with limited accessibility or visibility, it may be desirable to remotely apply filaments to surfaces. In particular, it may be desirable to reliably and consistently apply filaments to the interior of a small bore tube at a distance from the accessible end of the tube. It may also be desirable to reliably and consistently apply filaments to exterior surfaces at a distance. It may also be desirable to allow for installation of filaments by a robotic or other suitable mechanical device.

Optionally, to help facilitate generally consistent measurements along the length of a filament, it may be desirable to regulate the volume of adhesive used to bond the filament to a surface along the length of a filament strand.

Optionally, to help technicians to reproducibly adhere filaments to a surface, it may be desirable for an apparatus to help a user to achieve generally consistent bonding conditions.

Optionally, a single apparatus may be used to apply filament optic sensors for various different applications with different adhesive volume requirements, it may be desirable for an apparatus to have a selectable volume of adhesive used to bond the filament optic sensor to a surface.

Optionally, to help facilitate relatively quicker installation of multiple filaments on a given surface, it may be desirable to adhere multiple filaments to a surface simultaneously.

Optionally, an apparatus for adhering one or more filaments to a host surface may be configured to travel along the length of the filament(s) and coat at least a portion of the filament(s) with a bonding adhesive. For example, the apparatus may include one or more reservoirs containing an adhesive material (optionally a viscous adhesive material) and the filaments may be drawn through the reservoir to be coated in adhesive. For example, each reservoir may include at least one reservoir inlet and at least one filament outlet, and the filament could be threaded through the inlet and outlet. The apparatus may include multiple filament outlets (for example to simultaneously accommodate multiple filaments) and one or more filament inlets. Because filaments passing through the filament inlet has not yet been coated with adhesive, in some embodiments multiple filaments may pass through a single filament inlet, and then be divided into respective filament outlets after being coated with adhesive.

Coating the filament with adhesive may be achieved by imparting relative motion between the filament(s) and the apparatus, for example by translating the filament(s) relative to a fixed apparatus, translating the apparatus along the length of fixed filaments, and/or moving both the filaments and the apparatus relative to each other.

Optionally, while the embodiments described herein illustrate the use of an apparatus for installing fiber optic filaments on a surface, the apparatus may optionally be used in an analogous manner to adhere other types of flexible filaments to a surface, including, for example, electrical cables, conductive wires glass filaments, plastic filaments, cables, wires, string and the like. In some applications, it may be advantageous if the filament is also resilient, as well as being flexible. However, the apparatus may be used on non-resilient filaments as well.

Apparatuses for installing filaments may be configured for use with a variety of target surfaces, including, generally planar/flat surfaces and curved surfaces.

Figure 2:
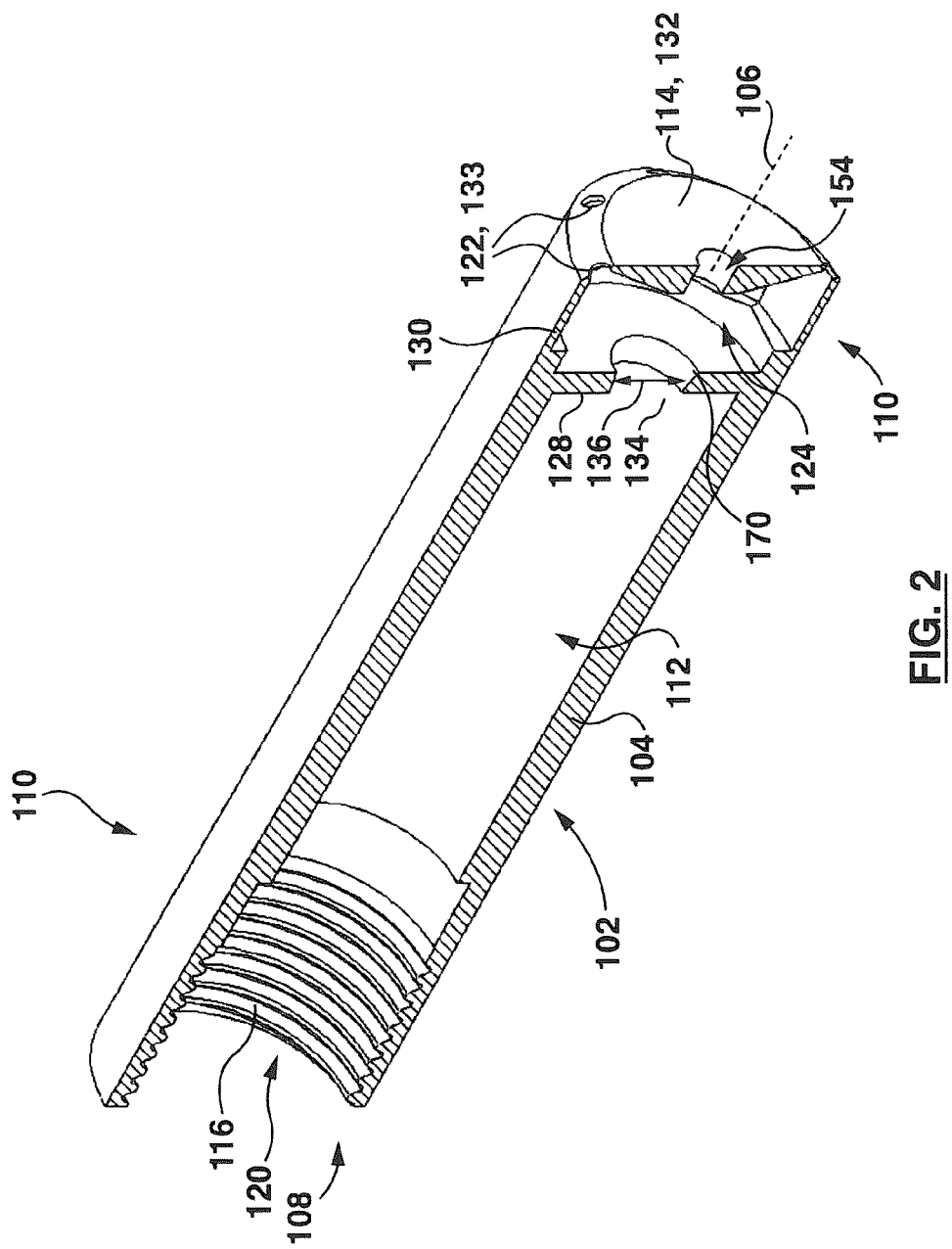
FIG. 2 is a perspective cross-section of the apparatus of FIG. 1, taken along line 2-2.
Figure 5:
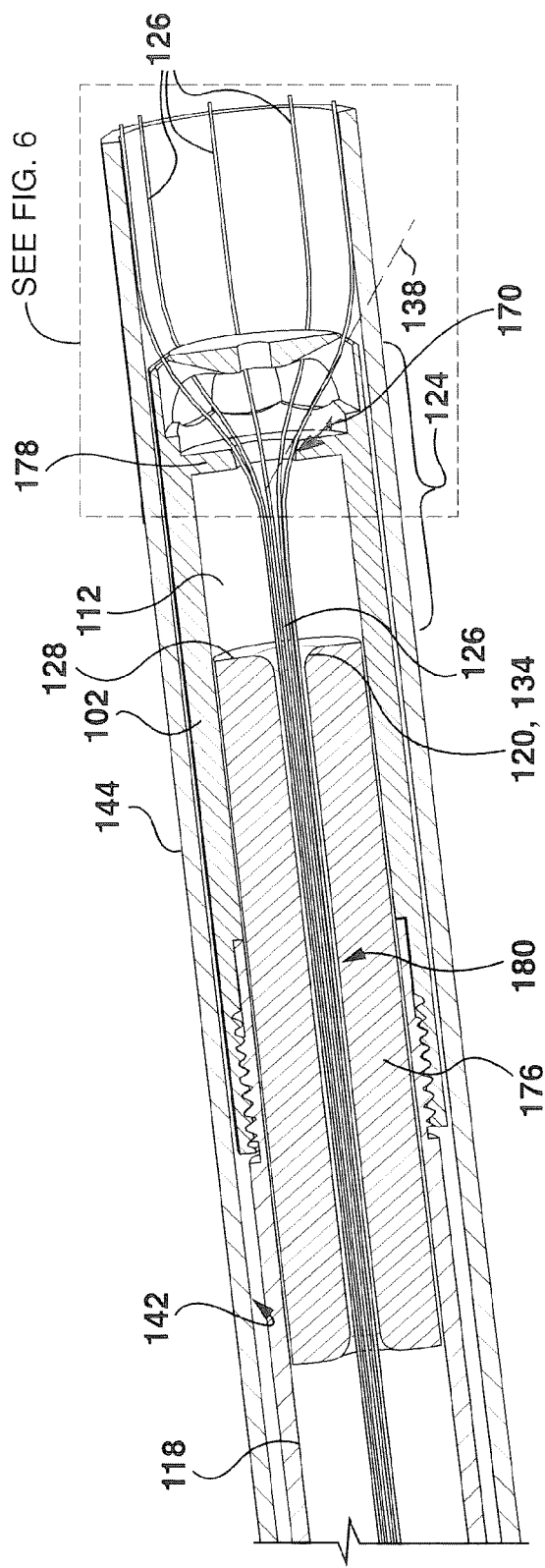
FIG. 5 is a perspective cross-sectional view of the apparatus of FIG. 1 positioned within a conduit.

Referring to FIGS. 1, 2 and 5, one embodiment of an apparatus 100 for adhering a fiber to a host surface includes a body 102 with a sidewall 104 that extends along a longitudinal body axis 106 between opposed first and second ends 108 and 110. The body 102 has a generally hollow interior 112 along most of its length for receiving one or more fibers, and may be connected to a variety of supporting members and/or tools when in use.

In the illustrated embodiment the second end 110 of the body includes an end wall 114, while the first of the body 102 is substantially open, and can be enclosed by a complimentary piston 103. Optionally, the first end of the body 102 can be provided with threads 116 for connecting to another tool, extension accessory or the like. For example, an extension conduit 118 (FIG. 5) may be connected to the body 102 to allow a user to remotely manipulate the body 102. Configuring the apparatus 100 for remote manipulation may help facilitate use of the apparatus 100 to remotely install fibers onto surfaces in dangerous or otherwise hostile environments, such as, for example, in environments with high or low temperature, high radiation environments, chemically contaminated environments and the like. This may help reduce the need for users to enter the environments, or may help reduce the amount of time spent in such environments during the installation process.

In this embodiment, the apparatus 100 includes a single fiber inlet in the form of a fiber inlet port 120 that is provided at the open first end 108 of the body 102. Alternatively, in other embodiments the fiber inlet may be provided in the sidewall, toward the second end or at any other suitable location.

The apparatus 100 also includes a fiber outlet in the form of plurality of fiber outlet ports 122, which are axially spaced apart from the fiber inlet port 120. In the illustrated embodiment the outlet ports 122 are located at the second end 110 of the body 102 and are spaced apart from each other around the circumference of the body 102. The illustrated embodiment includes eight fiber outlet ports 122, but other embodiments may include fewer ports (i.e. 1-7 ports) or more than 8 ports depending on the intended use of the apparatus.

The apparatus 100 also includes a reservoir chamber that is configured to contain any suitable viscous adhesive material, including previously mixed multi-part adhesives such as acrylics, urethanes and epoxies, one part adhesives requiring an external energy curing source such as ultraviolet light curing adhesives, ceramic and graphite adhesives, solvent based adhesives as well as moisture curing adhesives such as cyanoacrylates and urethanes. Referring also to FIG. 3, a reservoir chamber 124 is provided within the body 102, and in the illustrated embodiment is located at the second end 110. The reservoir chamber can be any suitable configuration, and in the illustrated example is generally cylindrical.

Providing the reservoir chamber 124 in close proximity to the fiber outlet ports 122 may help reduce the distance an adhesive-coated fiber travels after exiting the reservoir chamber 124 but while still within the body 102. In contrast, the reservoir chamber 124 could be provided toward the middle or the first end 108 of the body 102, but adhesive-coated fibers would then travel through the interior of the body from the reservoir to the fiber outlet ports. This may increase the chances of adhesive material fouling the interior surfaces of the body, and may complicate the operation and maintenance of the apparatus.

Figure 6:
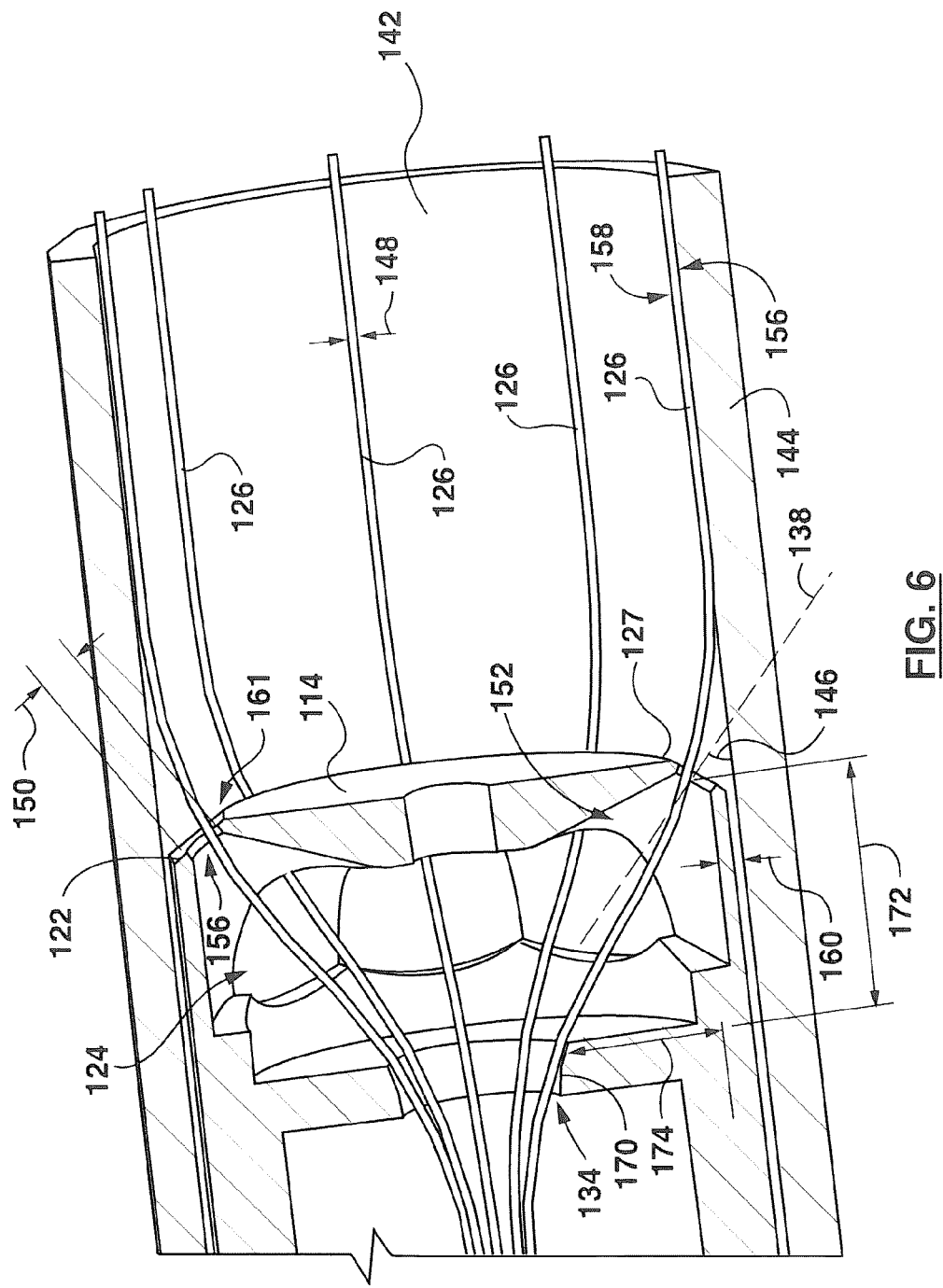
FIG. 6 is an enlarged view of a portion of FIG. 5.

In the illustrated embodiment, fiber travel paths extend between the fiber inlet port and each fiber outlet port. Referring also to FIGS. 5 and 6, exemplary fibers 126 are illustrated, with each defining and following respective fiber travel paths through the apparatus 100. In this example, the fibers 126 can be moved through the apparatus, from left to right as illustrated, to be coated with adhesive upon exiting fiber outlet ports. This may be achieved by pulling/drawing the fibers 126 to the right while keeping the body 102 still, translating the body 102 axially to the left while keeping the fibers 126 still, or a combination of the movement of both the fiber and the body (optionally in opposite directions, or in the same direction but at different rates).

Optionally, the fiber travel paths may be entirely discrete from each other (for example if the apparatus includes an equal number of fiber inlets and fiber outlets), or may at least partially overlap with each other. In the illustrated embodiment, the eight fiber travel paths overlap each other along a substantial portion of their length, through the interior 112 of the body 102, and only diverge toward the second end 110 of the body 102 as each fiber 126 is routed through its respective fiber outlet port 122.

Referring to FIG. 2, in the illustrated embodiment, the fiber inlet port 120 is generally centered relative to the body 102, and is intersected by the body axis 106. In this arrangement, fibers 126 being drawn through the fiber inlet port 120 travel relative to the body 102 in a generally axial direction, and optionally may be guided by portions of the apparatus 100 and/or portions of any connected tools (such as a portion of extension rod 118 as shown in FIG. 5). In contrast, the fiber outlet ports 122 are, in the illustrated embodiment, positioned around the periphery of the second end 110, and are radially/laterally spaced away from the body axis 106.

Alternatively, in other embodiments the fiber inlet port 120 may be offset from the body axis 106, and may be provided in the sidewall 104 or any other suitable location. Similarly, in some embodiments the body axis 106 may intersect one or more of the fiber outlet ports 122.

Optionally, the reservoir chamber 124 can be bounded by opposing first and second chamber end walls, and by at least one sidewall extending therebetween. Referring to FIGS. 2 and 3, in the illustrated example, the first end wall 128 of the reservoir chamber 124 is located within the interior 112 of the body 102, and is axially positioned between the first and second ends 108 and 110. The specific position of the first end wall 128 may be selected based on a variety of factors, including size of the body 102 and desired reservoir chamber size/volume and fibre contact angle to the host surface. The reservoir sidewall 130 in this example is coincident with a portion of the body sidewall 104, and the second end wall 132 of the reservoir chamber 124 is coincident with the second end wall 114 of the body 102. Alternatively, the sidewall 130 and second end wall 132 of the reservoir chamber 124 may be spaced apart from the walls of the body 102, such that the reservoir is a generally self-contained chamber disposed within the body 102.

To accommodate the incoming fibers, the reservoir chamber includes a reservoir inlet port to receive the fiber(s), and one or more reservoir outlet ports though which the fiber(s) can exit the reservoir chamber. In the illustrated embodiment, the first end wall 128 of the reservoir chamber 124 includes a fiber inlet in the form of an aperture 134 that serves as a reservoir inlet port. The aperture 134 is sized so that its diameter 136 (FIG. 2) is larger than the diameter of any given fiber 126 that can be threaded through the apparatus 100, and preferably is large enough to receive the eight fibers 126 in the illustrated example without interference between the fibers 126 and the end wall 128. It may also be sized in a way that the surface tension of the adhesive material keeps the adhesive material from flowing out of the reservoir chamber 124. In this configuration, the reservoir inlet port 134 is axially spaced apart from the fiber inlet port 120 of the body 102.

In contrast, in the illustrated example, the reservoir chamber 124 is positioned at the second end 110 of the body 102 such that the reservoir outlet ports 133 (FIG. 2) are coincident with the fiber outlet ports 122 in the body 102. That is, the same structure functions as both the fiber outlet port 122 and reservoir outlet port 133 in this example. In other embodiments, the reservoir chamber 124 may be positioned such that the reservoir outlet ports are spaced apart from the fiber outlet ports 122, and/or that the reservoir inlet port 134 is coincident with the fiber inlet port 120.

Optionally, the aperture 134 may include a gasket, seal or other suitable sealing member that can seal against the fibers 126 passing through the aperture 134. In some embodiments, this may help inhibit leakage of the adhesive from the reservoir chamber into the interior. Alternatively, as illustrated in the FIGS. 5 and 6, the aperture 134 need not include a seal, and may be configured so that the reservoir chamber 124 is in communication with the atmosphere. In this configuration, engagement between the surface of the fibers 126 and the viscous adhesive material within the reservoir chamber 124, when translating the fibers 126 through the aperture 134, may tend to urge the viscous adhesive material away from the aperture 134 (i.e. toward the fiber outlet ports 122), such that the adhesive may tend not to leak out of the aperture 134 even in the absence of a seal. That is, the reservoir inlet port 134 may be sized to slidably receive a fiber 126 in a non-sealed manner such that the fiber 126 physically contacts less than 100% of a perimeter of the reservoir inlet port 134. This non-sealed arrangement may also help maintain a desired pressure within the reservoir chamber 124, and may help reduce the likelihood of low and/or vacuum pressures being created within the reservoir chamber 124 when adhesive is drawn out of the reservoir chamber 124 with the fibers 126.

In some circumstances, the slidability of the fiber 126 within the reservoir inlet port 134 can be enhanced if the fiber 126 has less physical contact with the perimeter of the reservoir inlet port 134. In some embodiments, the reservoir inlet port 134 may be sized to slidably receive a fiber 126 in a non-sealed manner such that each fiber 126 physically contacts less than 80%, or less than 50%, less than 40%, less than 20%, less than 15%, less than 10% and optionally less than 5% of the length of the perimeter of the reservoir inlet port 134.

Referring again to FIG. 3 to FIG. 2, in the illustrated embodiment each fiber outlet port 122 is oriented such that a respective outlet port axis 138 (along with the fiber travels when passing through the outlet port 122) is inclined at an outlet angle 140 relative to the body axis 106, and, in this example, relative to the inner surface 142 of the conduit 144 that the fiber 126 is being adhered to. In this arrangement, fibers 126 exiting the fiber outlet ports 122 may travel in substantially the axial direction and may contact the host surface at an angle 146 (FIG. 6) that is substantially the same as the outlet angle 140. The outlet angle 140 may be any suitable angle, and may optionally be between about 5 degrees and about 85 degrees, between about 10 degrees and about 75 degrees, between about 20 and about 60 degrees, between about 30 and about 45 degrees and optionally may be about 35 degrees.

As the fiber 126 exits the reservoir chamber 124 via the fiber outlet port 122 it will bring a coating of adhesive material with it. The amount of adhesive material that is actually drawn out of the reservoir chamber 124 with the fiber 126 can depend on a variety of factors, including the viscosity of the adhesive, the velocity of the fiber, the composition of the fiber, the configuration of the fiber outlet port (diameter, shape, length) and the like. For example, one factor that may affect the adhesive coating the fiber 126 is the difference between the diameter 148 (FIG. 6) of the fiber 126 and the diameter 150 of the fiber outlet ports 122. In general, the smaller the difference between diameters 148 and 150, the thinner the adhesive coating will be on the fiber 126.

Optionally, the fiber outlet ports 122 may include a metering portion to help control the amount of adhesive on the fiber 126, and/or the distribution of the adhesive around the perimeter of the fiber 126. For example, the fiber outlet ports 122 need not be symmetrically positioned relative to the fibers 126, such that one side of the fiber 126 may be coated in a thicker layer of adhesive than another side of the fiber 126.

In the illustrated example, one example of a metering portion is provided in the form of a generally tapering metering passage 152 (FIG. 6) that extends inwardly from the fiber outlet port 122. In this example, the tapering section is substantially frusto-conical, and narrows toward the outer end of the outlet port 122. Alternatively, the tapering portion may have a different configuration.

The downstream end of the metering orifice, i.e. the portion that terminates at the outlet port 122, may have a relatively sharp-edge. This configuration may help ensure that the adhesive flows with the passage of the fiber 126 and that the adhesive is held back when the fiber 126 is stationary with respect to the apparatus. This may help create a pressure within the adhesive at the orifice and may help expel air within the region. That is, in some embodiments, the metering passages 152 may help inhibit shearing the adhesive from the fibre 126, and may help keep the dispensed volume of adhesive substantially constant under varying conditions (i.e. within a target volume tolerance for a given application).

Optionally, the fiber outlet ports 122 may be sized so that the diameter 150 is any suitable size that is compatible with the fiber/filament and adhesive materials to be used with the apparatus. Optionally, in some embodiments, the fiber outlet port diameter 150 may be between about 300 micrometers (μm) and about 2000 micrometers (μm) or more, and may be between about 400 μm and about 1700 μm. In other embodiments, the fiber outlet port diameter may be less than 300 μm or may be more than 2000 μm depending on the requirements for a given apparatus.

Optionally, the fiber outlet port diameter 150 may be selected based on the diameter 148 of the fiber/filament that is to be used with the apparatus so that the size of the gap between the outer surface of the fiber 126 and the perimeter/edge of the fiber outlet port 122 is within a desired range. For example, the fiber outlet port diameter 150 may be selected so that the diameter 148 of the fiber 126 used with the apparatus 100 is between about 5% and about 95% of the outlet port diameter, and may be between about 10% and about 80% of the outlet port diameter, for example. In some embodiments, a fiber outlet port 122 may have a diameter 150 that is at least 10% larger than a diameter 148 of the fiber 126 that it is designed to convey.

In embodiments having more than one fiber outlet port 122 (and therefore more than one corresponding reservoir outlet port), the diameters 150 of the more fiber outlet ports 122 may vary, and need not be the same as each other. Furthermore, each fiber outlet port 122 may be sized to convey a different size of fiber 126, and optionally fibers 126 of different sizes may be threaded through the apparatus 100 at the same time. For example, the apparatus 100 may be used simultaneously with at least two different fibers 126 that have different diameters 148. Fibers 126 of different diameters may optionally be fed through fiber outlet ports 122 that have the same diameters 150, or that have different diameters 150. For example, a first fiber outlet port 122 can have a first diameter 150 sized to convey a fiber with a diameter of 125 micrometers (μm) and a fiber outlet port 122 can have a second diameter 150 to convey a fiber that is 210 micrometers (μm).

In some embodiments, the reservoir chamber 124 may also include an adhesive inlet port that is in communication with the reservoir chamber, and is separate from the reservoir inlet and outlet ports. Providing a separate adhesive inlet port may help facilitate filling of the reservoir chamber while the apparatus is threaded through the reservoir inlet and outlet. Adhesive material can be deposited in the reservoir chamber 124 through the adhesive inlet port. The adhesive inlet port may be spaced apart from the reservoir inlet port and the at least one reservoir outlet port. In the illustrated example, an adhesive inlet port 154 (FIG. 2) is disposed in the end wall 132 of the body 102, but may be provided in any other suitable location.

The adhesive inlet port 154 may optionally be sealed by an openable plug 157, which is illustrated in FIG. 1 but is not shown in the other drawings. The openable plug 157 may be removed to open the adhesive inlet port 154. The adhesive inlet port 154 and the openable plug 157 can fit together using an interference fit (i.e. a rubber plug 157 can be pressed can be pressed into the port 154, may include complementary threading or any other suitable attachment mechanism that allows the plug 157 to be opened/detached. The plug may be formed of a rubber, plastic, or other polymer-based material. Optionally, a permanent plug may also be used (such as bonded in place using fast acting adhesives).

Referring to FIG. 6, when the illustrated embodiment of the apparatus 100 is positioned within the conduit 144, the adhesive-coated fiber 126 exiting the fiber outlet ports 122 is directed at the outlet angle 140 towards the surface 142 and bends in a generally arcuate shaped when contacting the surface 142. If the fibers 126 used are resilient, such flexing of the fibers 126 may cause the fiber 126 itself to act as a spring/biasing member that urges the fiber 126 toward the surface 142. This inherent spring force may, in some embodiments, reduce and/or eliminate the need for a user to apply external force to press the adhesive-coated fiber 126 against the surface 142. Upon contact with the surface 142, the adhesive-coated fiber 126 can be held in place by wetting properties of the viscous adhesive material while the adhesive dries/cures.

Optionally, the adhesive coating on the fibers 126 exiting the apparatus 100 may be asymmetrical around the perimeter of the fibers 126. For example, a greater quantity of adhesive may be provided on a bonding side 156 (FIG. 6) of the fibers 126 (i.e. the portions of the fibers 126 that are intended to face the underlying surface) than on the exposed side 158 of the fibers 126 (i.e. the portions of the fibers 126 that generally face away from the underlying surface to which the fiber is bonded). Alternatively, a greater quantity of adhesive may be provided on the exposed side 128, such that the amount of adhesive positioned between the bonding side 156 of the fibers 126 and the surface is reduced. Distributing/applying the adhesive material in an asymmetrical manner may be achieved using any means, including, for example, applying more adhesive to the bonding side of the fibers, applying a generally equal coating of adhesive material and the scrapping or removing a portion of the adhesive form the exposed sides, and the like.

Referring to FIG. 6, in the illustrated example, the fibers 126 pass non-concentrically through the fiber outlet ports 122. In this arrangement, the a distance between the bonding side 156 of the fiber 126 and its opposing portion of the perimeter of the fiber outlet port 122 is greater than the corresponding spacing between the opposing, exposed side 158 of the fiber 126 and its opposing portion of the perimeter. The amount of adhesive that remains on each side 156 and 158 of the fiber 126 after it exits the fiber outlet port 122 can be generally proportional to the side of the gap that is provided between sides 156, 158 of the fiber 126 and the perimeter of the fiber outlet port 122.

Therefore, providing a larger gap adjacent on the bonding side of the fiber 126, relative to the gap adjacent the exposed side 158, may lead to a larger amount of adhesive material being provided on bonding side 156 as compared to the exposed side 158.

In this configuration, a portion of the perimeter of the fiber outlet port 122 that faces the exposed side 158 of the fiber 126 may function as a skimmer 161, to help limit thickness of the adhesive coating on the exposed side 158 by skimming off adhesive that will not fit through the gap and retaining it within the adhesive reservoir chamber 124. In this example, the skimmer 161 (FIG. 6) is a portion of the perimeter of the fiber outlet port 122, but alternatively may be provided as a separate member, or as a portion of the body 102 or other appropriate structure.

In the illustrated example, the adhesive material may be positioned only between the end walls 128 and 132. Alternatively, some of the adhesive material may also be stored in the hollow interior region 112, preferably adjacent the rear/outer side of the wall 128. In such a configuration, the reservoir chamber 124 would also include portions of the hollow interior 112. This may help increase the quantity of adhesive material that can be stored in the apparatus 100.

Optionally, adhesive material can be contained within hollow interior 112 without requiring additional end walls or other containment structures. That is, the first end 108 may remain open even if adhesive material is located within the interior 112, as the inventors have found that adhesives with a sufficiently high viscosity can remain within the interior region 112 in the absence of a containment structure. It has also been observed that the relative motion of the fibers 126, to the right as illustrated in FIG. 3, also tends to help draw the viscous adhesive toward the second end 110 of the apparatus, and keep it within the interior region 112.

While not necessary, in embodiments where the reservoir 124 does include at least a portion of the interior region 112, the apparatus 100 may be provided with reservoir chamber end wall 128 that is separate from, and spaced apart from the fiber guide surfaces 170 (FIG. 6). In such examples, the wall supporting the fiber guide surfaces 170 may not form part of the boundary of the reservoir chamber 124, and instead may be disposed within the reservoir chamber 124—axially spaced between the end walls of the reservoir chamber 124.

For example, the apparatus 100 may be configured such that the first end 108 of the apparatus 100 is not open, but instead includes an end wall that forms the boundary of the reservoir chamber 124. Referring to FIG. 5, in one embodiment the apparatus 100 can be provided with an optional insert member 176. By placing the insert member 176 in the open end 108, the apparatus 100 can be reconfigured such that the reservoir chamber 124 includes both the tip-based chamber labelled in FIGS. 1-3, along with a portion of the interior region 112. In this arrangement, the physical arrangement of the body 102 is unchanged, but the function of some of its features has been modified. For example, in this modified configuration the first end wall 128 of the reservoir chamber 124 is provided by the inner surface of the insert member 176, and the wall containing the fiber guide surfaces 170, numbered with reference character 178 in this configuration, is now an internal structure that is within the reservoir chamber 124 and has adhesive material on both sides. A central bore 180 in the insert member 176 provides the fiber inlet port 120 and the reservoir inlet port 134 in this alternative configuration.

Optionally, the reservoir chamber may be adjustable, such that the size of the chamber can be varied based on the quantity of adhesive material. For example, the reservoir chamber may be adjusted to hold different quantities of adhesive material. Optionally, the volume of the reservoir chamber 124 can be adjusted while the apparatus is in use, such that, for example, the reservoir chamber 124 can be made smaller as adhesive material is used. This may help maintain a desired level of adhesive material within the reservoir chamber 124, and/or may help reduce the presence of air bubbles, voids and gaps within the reservoir chamber 124.

Referring to FIG. 5, in this alternate configuration of the apparatus 100, the size of the reservoir chamber 124 can be adjusted by axially sliding insert member 176 within the interior 112 of the body 102. Sliding the insert member 176 toward the second end 110 can reduce the size of the reservoir chamber 124, while sliding the insert member 176 toward the first end 108 can increase the size of the reservoir chamber 124. Optionally, the insert member 176 can be freely slidable relative to the body 102, or may be driven, biased or otherwise motivated.

Optionally, the apparatus 100 may include one or more filament guides that can help guide/direct the filaments as they pass through the body 102. Optionally, the filament guides may be positioned within the reservoir chamber 124, may form part of the walls bounding the reservoir chamber 124 and/or may be positioned at another suitable location within the apparatus.

For example, a filament guide can be positioned in the fiber travel paths to help align the filaments in a desired orientation as they travel through the reservoir 124 and exit via the outlet ports 122. Referring to FIGS. 2 and 3, in the illustrated embodiment the first end wall 128 functions as both a boundary wall for the reservoir 124 and as a filament guide structure. That is, portions of the perimeter of the aperture 134 provide filament guide structures in the form of fiber guide surfaces 170, along which the fibers 126 slide as they translate along their respective fiber travel path.

In this embodiment, the fiber guide surfaces 170 are positioned such that the portion of the fiber 126 extending between the fiber guide surface 170 and its outlet port 122 lies generally along the outlet port axis 138, and travels through the outlet port 122 at the desired outlet angle 140. The outlet angle 140 of a given apparatus may be adjusted by altering the configuration of the fiber guide surface 170 and/or its position relative to the corresponding outlet port 122. In the illustrated example, the fiber guide surface 170 is offset axially rearward (i.e. upstream) from its outlet port 122 by an axial distance 172, and is offset radially inboard of its outlet port 122 by a radial distance 174. By changing one or both of these distances 172, 174, the outlet angle 140 of the fiber 126 exiting the port may be altered. In the illustrated example, the fibre guide surfaces 170 are fixed, but optionally could be adjustable/movable such that a given apparatus may be configured to provide different outlet angles 140 and/or be used in combination with filaments having different properties.

Referring to FIG. 5, in this alternate configuration of the apparatus 100, the fiber guide surfaces 170 are provided on internal wall 178, which is within the interior of the larger reservoir chamber 124 illustrated in this configuration.

Referring again to FIG. 1, in this embodiment the apparatus is configured to adhere up to eight fibers onto the interior surface 142 of the conduit 144, which in the example illustrated has a 0.5" internal diameter. In this embodiment, the outer diameter 162 of the body 102 can be about 10.5 mm.

Optionally, the size of the body 102 and the radial position of the fiber outlet ports 122 can be selected to provide a desired offset distance between the fiber outlet ports 122 and the surface. Changing the offset distance may modify the degree of curvature of the fiber 126 as it is laid on the surface. Modifying the radius of curvature of the fiber 126 may, in some instances, alter the amount of resilient force that urges the fiber 126 toward the surface. Also, some filaments may have a minimum curvature radius that can be used without inhibiting the use and/or performance of the filament (for example, too tight a radius of curvature may cause the fiber to break, become unsuitable for its intended use and the like). Optionally, the offset distance can be selected for a given apparatus, having regard to the type of filament that is to be installed, such that the offset distance will produce an acceptable fiber curvature.

Referring to FIG. 6, in the illustrated example the offset distance 160 is measured as the generally radial distance between the inner surface 142 of the conduit 144 (i.e. the surface to which the fiber is going to be adhered) and the lower edge of the fiber outlet port 122.

The apparatus 100 can be designed to suit various surface geometries. For example, a round form can fit inside a tube or circular opening, allowing the fiber to be adhered to the inside surface of tubes. Such tubes can be as small as 5 millimeters (mm) in diameter and can be several meters long. For example, the apparatus 100 may be sized to install fibers on the inner surface of a heat exchanger tube with a diameter of about 11 mm and a length of more than 20 m, or for use within a pipeline having a length of more than 1 km. The apparatus 100 may be sized so that its outer diameter 162 is suitable for such uses. In some examples, the outer diameter 162 may be between 3 mm and about 50 mm or more, between about 4 mm and about 15 mm, between about 6 mm and 12 mm and optionally may be less than 3 mm.

Optionally, instead of being configured to fit within a conduit, the apparatus may be configured to adhere fibers to the exterior surfaces of an object. In such configurations, the apparatus body need not be cylindrical, and instead may have another suitable configuration.

Figure 7:
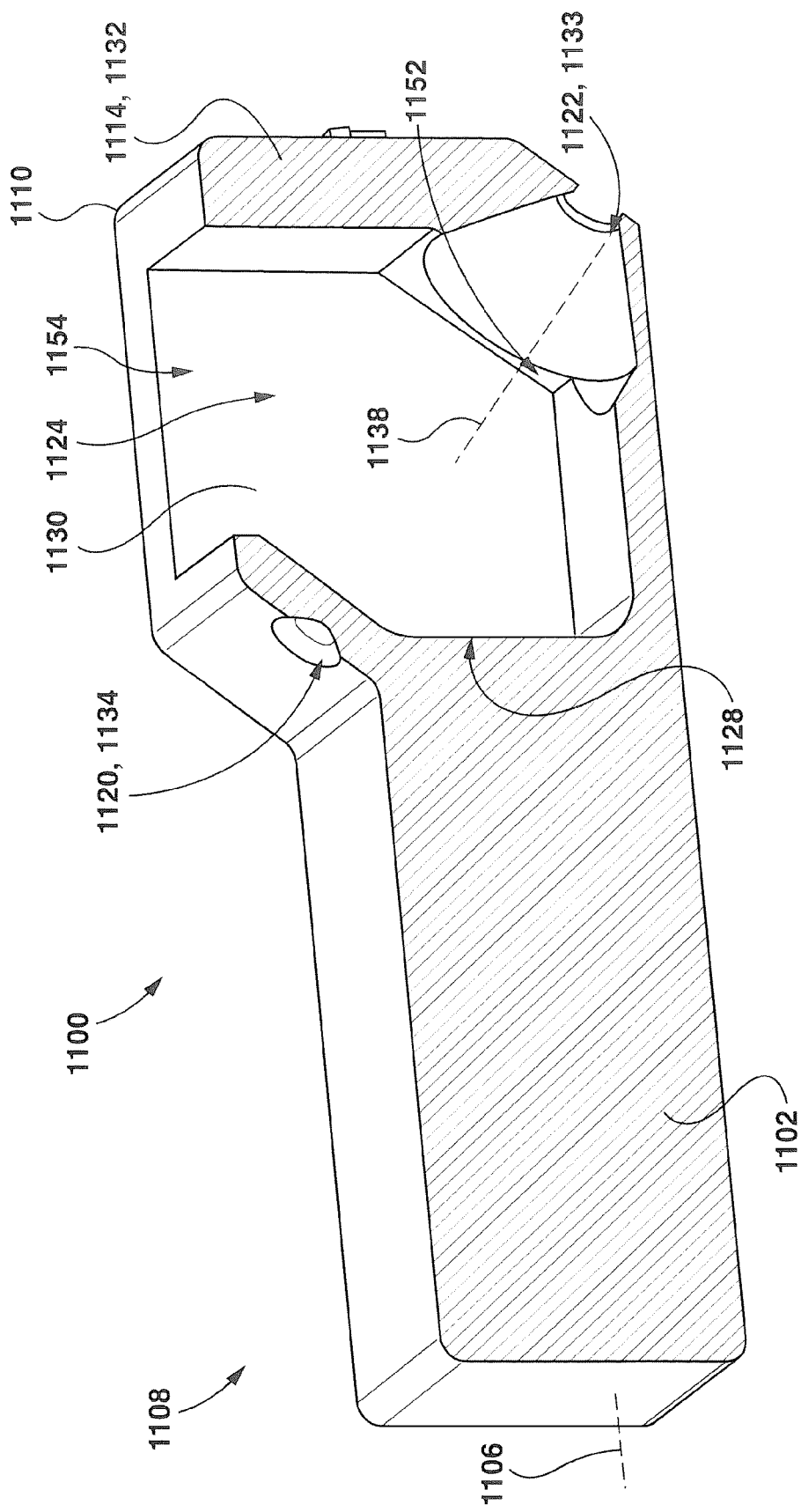
FIG. 7 is a perspective view of another example of an apparatus for adhering a fiber to a surface, with a portion of the apparatus body cut-away.

FIG. 7 is a cross-sectional view of another example of an apparatus 1100 for adhering fibers to a surface includes a body 1102, a fiber inlet port 1120, one fiber outlet port 1122, with a metering passage 1152, and a reservoir chamber 1124. The apparatus 1100 is generally analogous to the apparatus 100, and like features are identified using like reference characters indexed by 1000.

In this embodiment, the body 1102 extends along a body axis 1106 between its first and second ends 1108 and 1110, but does not include the substantially hollow interior along its full length as shown in the apparatus 100.

In this embodiment, the fiber inlet port 1120 is provided toward the top of the body 1102, and is radially/laterally off set from the body axis 1106. Further, as most of the body 1102 is solid, the fiber inlet port 1120 also functions as the reservoir inlet port 1134, and is coincident therewith, and the reservoir outlet port 1133 is coincident with the fiber outlet port 1122.

Optionally, as illustrated in this embodiment, the reservoir chamber 1124 need not be sealed, and instead may include an open region, such as an open top, that can function as the adhesive inlet 1154. Having an open portion of the reservoir chamber 1124 may allow a user to see the interior of the reservoir chamber 1124 while the apparatus is in use. Alternatively, a cover may be provided to seal the upper side of the reservoir chamber 1124. In this configuration, the end wall 1114 of the body 1102, which is co-incident with the end wall 1132 of the reservoir 1124, need not include an adhesive inlet.

Figure 14:
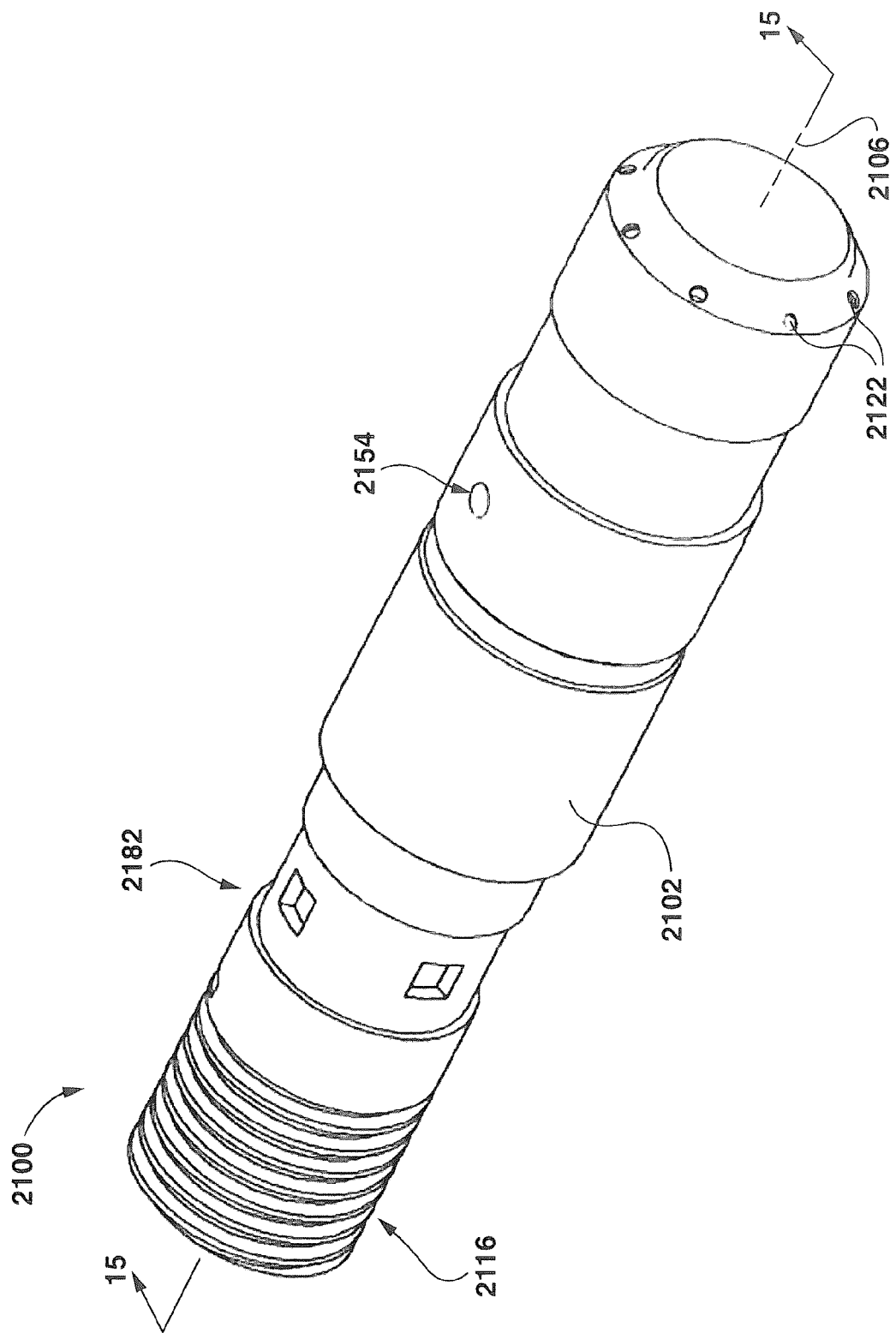
FIG. 14 is a perspective view of another example of an apparatus for adhering a fiber to a surface.
Figure 15:
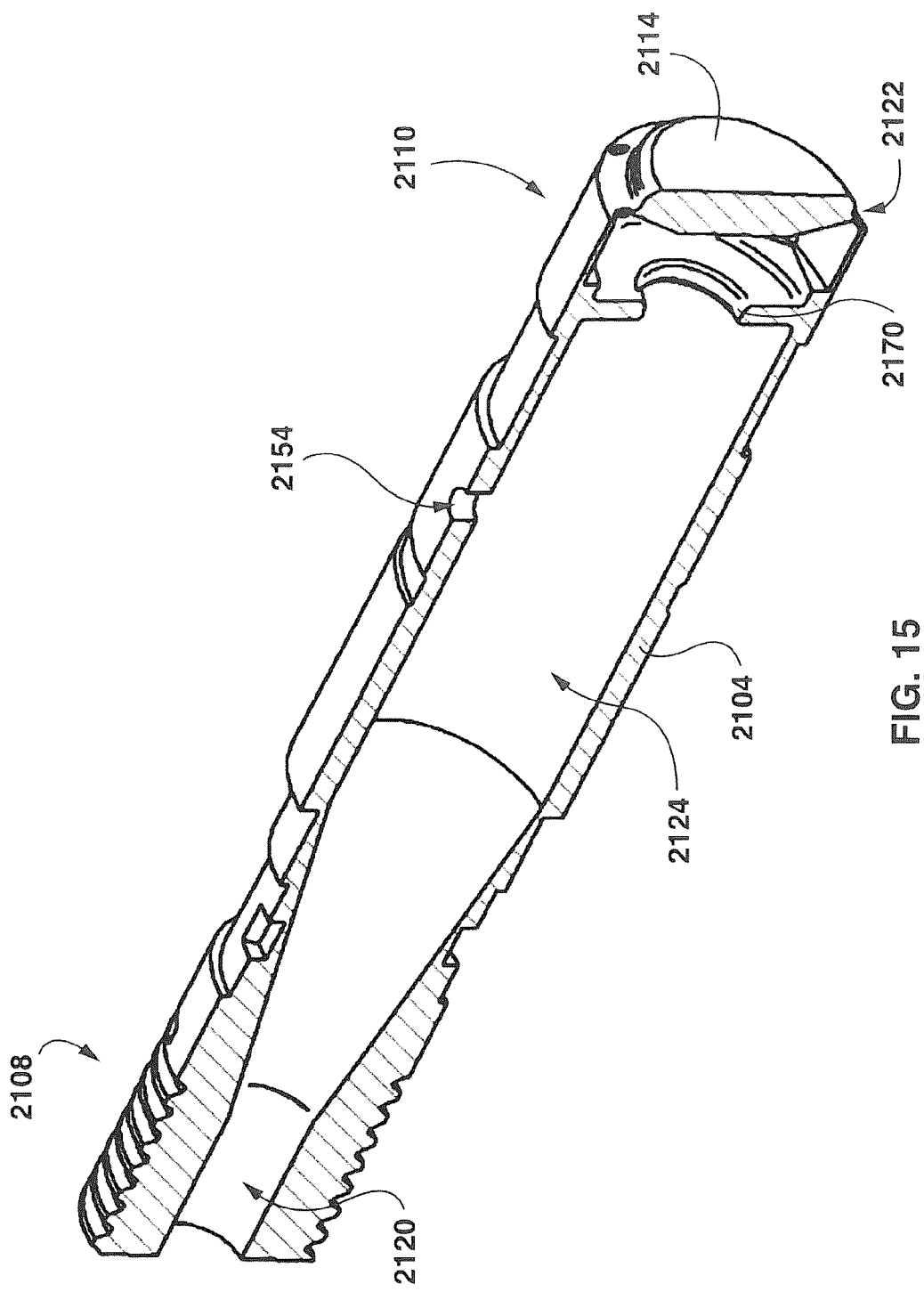
FIG. 15 is a perspective cross-sectional view of the apparatus of FIG. 14, taken along line 15-15.
Figure 16:
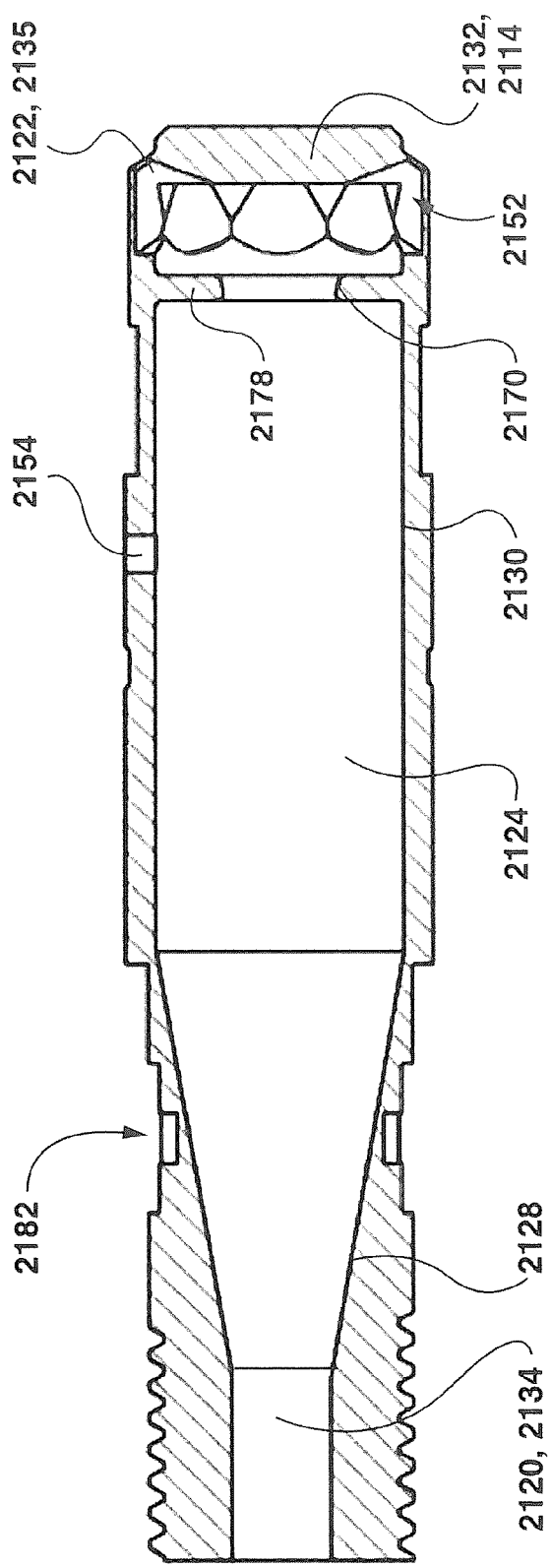
FIG. 16 is a side elevation, cross-sectional view of the apparatus of FIG. 14

Referring to FIGS. 14-16, another example of an apparatus 2100 for adhering fibers to a surface includes a body 2102, a fiber inlet port 2120, fiber outlet ports 2122, and a reservoir chamber 2124. The apparatus 2100 is generally analogous to the apparatus 100, and like features are identified using like reference characters indexed by 2000.

In this embodiment, the end wall 2128 of the reservoir chamber 2124 is tapered and includes the fiber inlet port 2120, which is also coincident with the reservoir inlet port 2134 in this example. The reservoir outlet ports 2133 and fiber outlet ports 2122 are coincident in this embodiment, and a metering passage 2155 is provided adjacent each port 2133. The fiber support surfaces 2170 are provided on a separate wall 2178 which is located within the interior of the reservoir chamber 2124.

In this embodiment, the adhesive inlet port 2154 is provided in the reservoir sidewall 2130, rather than in one of its end walls. This allows the end wall 2132 to be free of openings, and allows the reservoir chamber 2124 to be filled even if the end wall 2132 is not accessible.

In some configurations, such as the embodiments 100 and 1100, the apparatus may be re-usable. Alternatively, in some embodiments, such as embodiment 2100, the apparatus may be a single use device that is itself bonded to a portion of the object/surface to which the fibers are adhered. For example, if the apparatus 2100 is used to install fibers along the inner surface of a conduit (analogous to the embodiment shown in FIG. 5), the body 2102 itself may be fixed to the conduit, rather than being removed from the fibers. Referring to FIG. 14, in the illustrated embodiment, the body 2102 includes an attachment region 2182 on its outer surface, in the form of grooves and recesses. When the apparatus 2100 has reached the end of the conduit, the attachment region 2182 can be filled with adhesive to bond the body 2102 to the conduit while the fibers are still threaded through the fiber travel paths. Any adhesive remaining in the reservoir chamber 2124 can be allowed to cure, thereby bonding the fibers to the apparatus 2100. In this arrangement, the apparatus 2100 itself forms part of the transition between bonded sections of the fibers (inside the conduit) and non-bonded sections of the fibers (outside the conduit), and can carry some of the bending and shear loads that would otherwise be exerted on the fibers. This can help reduce the loading on the fibers, particularly at the transition between bonded and non-bonded regions, which may help reduce the chances of installed fibers being damaged.

Figure 8:
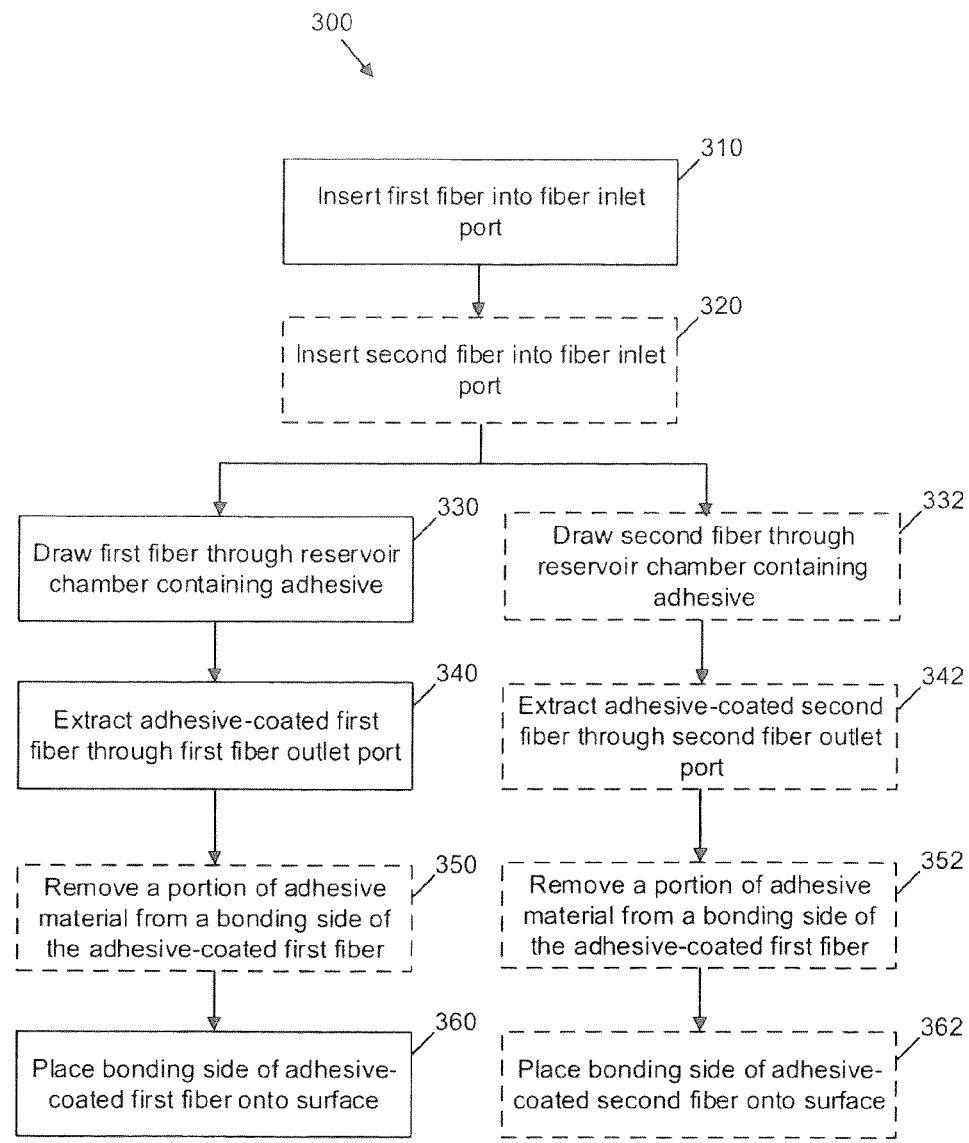
FIG. 8 is a flow chart illustrating method of adhering a fiber to a surface using an apparatus.

Referring to FIG. 8, a method 300 of adhering a fiber to a surface using an apparatus, such as those described herein, begins at step 310 which includes inserting a first fiber into a fiber inlet port on a body portion of the apparatus. An optional step 320 includes inserting a second fiber, and subsequent fibers into the fiber inlet port (or into respective fiber inlet ports).

The method also includes the step 330 of translating the apparatus relative to the surface and first fiber so that the first fiber is drawn through the reservoir chamber and coated with the viscous adhesive material. If the step 320 is included, the method also includes the step 332 of translating the apparatus relative to the surface and second fiber so that the second fiber is drawn through the reservoir chamber in unison with the first fiber and is coated with the viscous adhesive material. That is, steps 330 and 332 can occur simultaneously.

The method also includes the step of 340 of extracting the adhesive-coated first fiber through a first fiber outlet port on the body portion downstream from the reservoir chamber. If the step 320 is included, the method also includes the step 342 of extracting the adhesive-coated second fiber through a second fiber outlet port on the body portion downstream from the reservoir chamber. Steps 340 and 342 can occur simultaneously. As the fiber exits the fiber outlet port, the fiber travels along an outlet port axis that can be inclined relative to the surface so that the fiber bends between the fiber outlet port and the surface. A natural resilience of the fiber can urge the bonding side of the fiber toward the surface, which may help hold the fiber in place which the adhesive begins to cure.

Optionally, the method can include the step 350 for the first fiber and step 360 for the second fiber. Steps 350 and 352 can occur simultaneously. Steps 350 and 360 includes, for each fiber, removing at least a portion of the viscous adhesive material from the bonding side of the fiber as the fiber exits through the fiber outlet port so that the bonding side is coated with less adhesive material than an opposing outer side of the fiber.

The method also includes the step 360 of placing a bonding side of the adhesive-coated first fiber exiting the first fiber outlet port onto the surface whereby the viscous adhesive material adheres the first fiber to the surface. If the step 320 is included, the method also includes the step 362 of placing a bonding side of the adhesive-coated second fiber exiting the second fiber outlet port onto the surface whereby the viscous adhesive material adheres the second fiber to the surface. Steps 360 and 362 can occur simultaneously.

Some experiments have been conducted to investigate various aspects and configurations of the apparatuses and methods disclosed herein. Some experiments were directed to investigating examples of bonding requirements and investigating adhesive properties. Some other experiments were directed to developing a method in which a desired volume of adhesive could be dispensed and developing a method in which a fiber can be placed at the desired location. Experiments were also done to investigate us of an apparatus that to install a fiber (or other such filament) within the confines of ab elongate tube/conduit.

Some experiments included bonding a fiber to a prepared surface by first passing the fiber through an adhesive reservoir and through outlet port in one example of an apparatus to help gauge the volume of adhesive that would coat the fiber. The fiber was then allowed to come into contact with the prepared surface and the adhesive allowed to set, or cure.

An experiment was conducted using a common fiber size in combination with a series of different fiber outlet port sizes. Aluminum plates were prepared by glass beading (sand-blasting) the plates to a generally uniform surface appearance, which may help remove the oxide surface from the plate as well as any surface contamination. The fiber was then bonded onto this surface within one hour of glass beading.

Figure 9A:
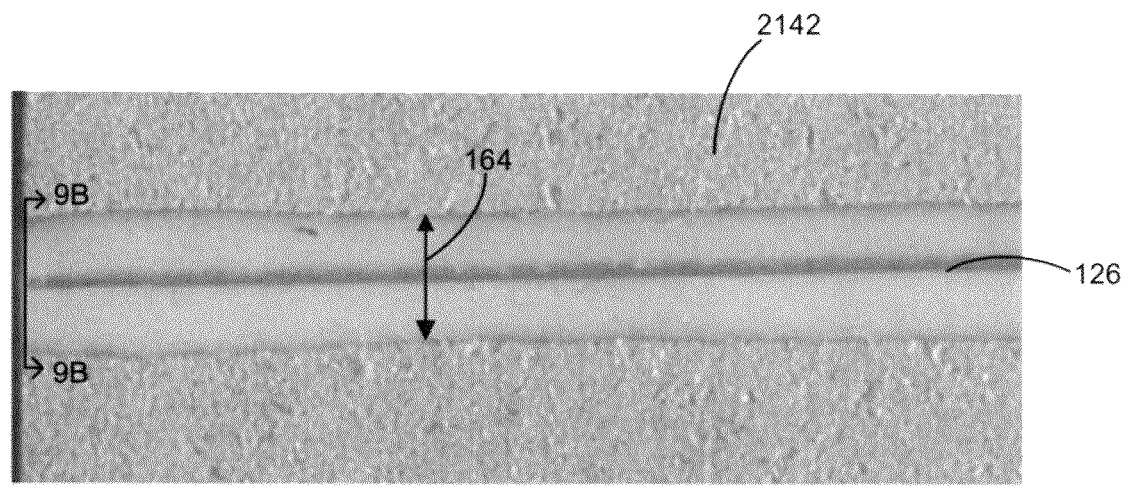
FIG. 9A is a top view of one example of a fiber adhered to a surface.
Figure 9B:
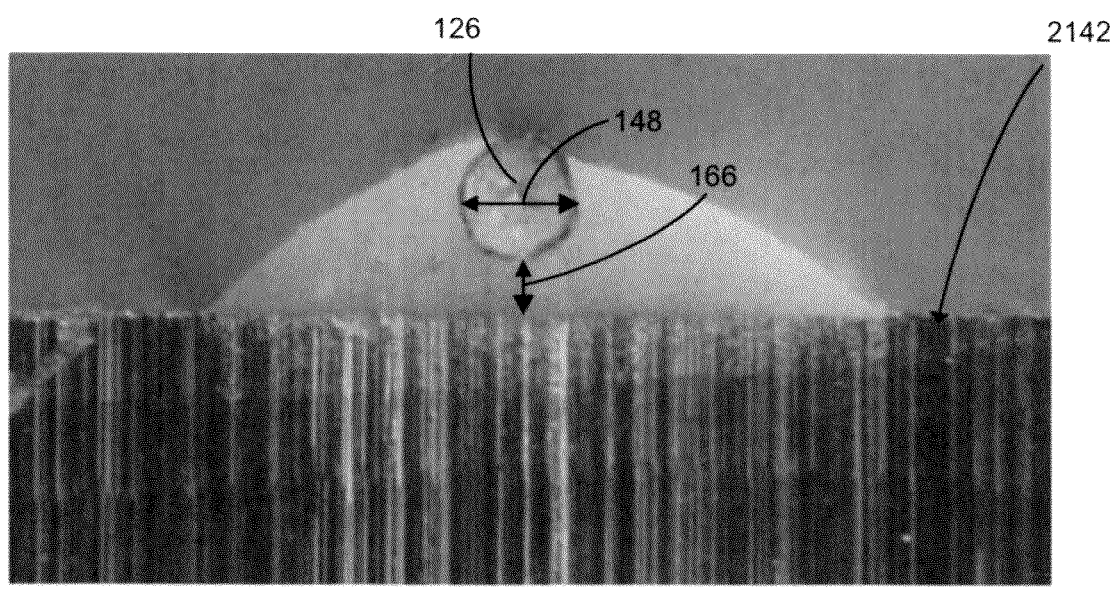
FIG. 9B is a cross-sectional view of the fiber of 9A, taken along line 9B-9B.

An apparatus analogous to the apparatus 1100 (FIG. 7) was used to conduct some experiments in which, while holding the end of the fiber firmly to the test surface (identified as surface 2142 in FIGS. 9A and 9B), the apparatus was pulled along the surface, allowing the fiber 126 to run through the adhesive and outlet port. The angle of the apparatus relative to the surface was adjusted until the fiber 126 was flexed to approximately a 10 mm bend radius (corresponding to an approximately 35 degree contact angle), allowing the adhesive coated fiber 126 to touch the test plate. The wetting properties of the adhesive held the fiber 126 in place until the adhesive cured. Once the adhesive cured, the test plates were sheared across the fiber 126, and machined smooth using the cylindrical face of a milling cutter for examination of the fiber 126 and adhesion.

Figure 10A:
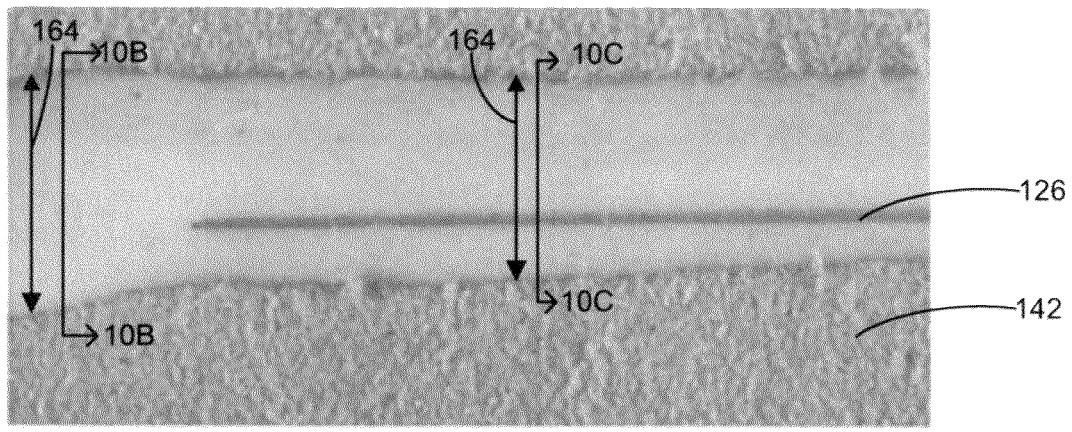
FIG. 10A is a top view of one example of a fiber adhered to a surface.
Figure 10B:
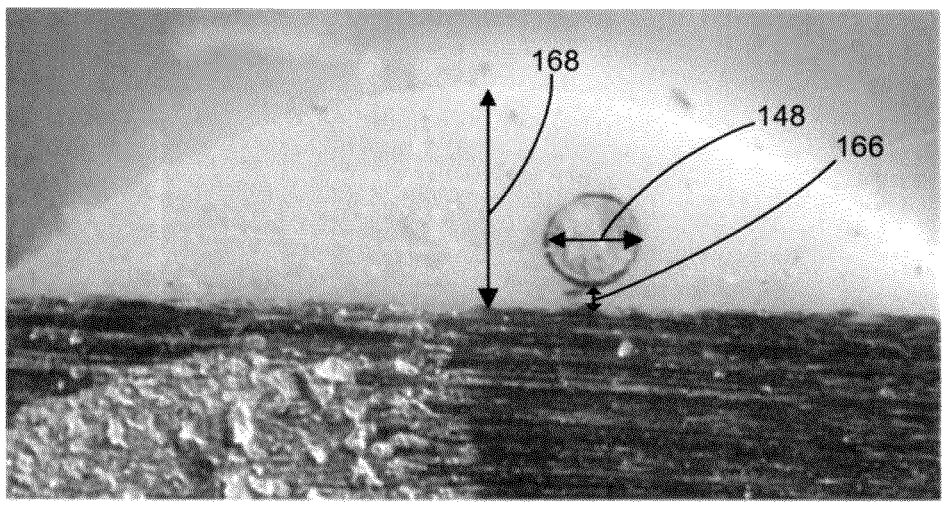
FIG. 10B is a cross-sectional view of the fiber of 10A, taken along line 10B-10B.
Figure 10C:
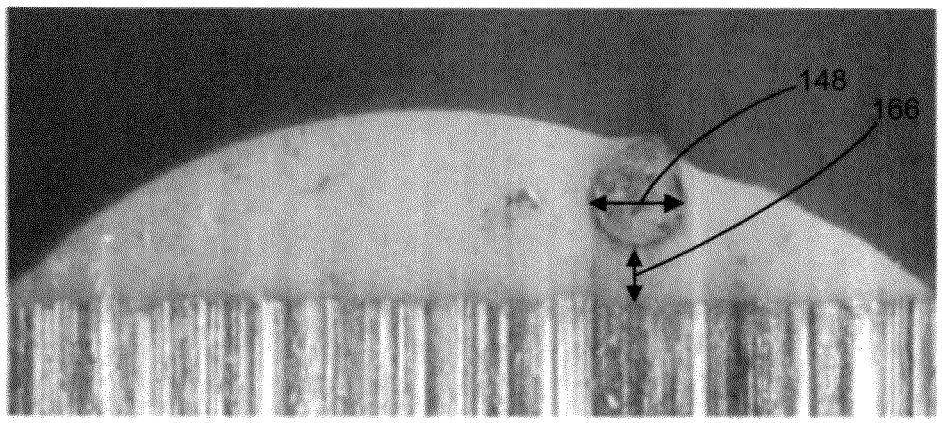
FIG. 10C is a cross-sectional view of the fiber of FIG. 10A, taken along line 10C-10C

It was observed that the cross sectional area of the adhesive cap (i.e. the amount of adhesive coating the fiber 126) generally increased when the diameter of the outlet port was increased (while using the same fiber 126), and that the adhesive was applied generally asymmetrically around the perimeter of the fiber 126. The cross-sectional area of the adhesive cap shown in FIGS. 9A and 9B was obtained when a fiber 126 having a diameter of 125 µm was pulled through an outlet port having a diameter of approximately 740 µm. The resulting adhesive layer produced had a cross-sectional width 164 of approximately 750 µm. A similar test using the same fiber size but a fiber outlet port diameter of about 1070 µm, as shown in FIGS. 10A-10C, created an adhesive cap having a cross-sectional width of approximately of 1200 µm (taken at line 10C-10C) and of approximately 1400 µm (taken at line 10B-10B). In this experiment, the total thickness 168 of the adhesive layer was approximately 330 µm. The adhesive cap shown in FIGS. 11A and 11B was obtained using the a fiber of the same diameter 148 and a fiber outlet port having a diameter of approximately 1610 µm, and has a cross-sectional width 164 of approximately 1600 µm.

In these examples the thickness 166 of the adhesive layer between the bonding side of the fiber 126 and the surface 142 is different than the thickness of the adhesive layer, if any, covering the exposed side of the fiber.

Figure 11A:
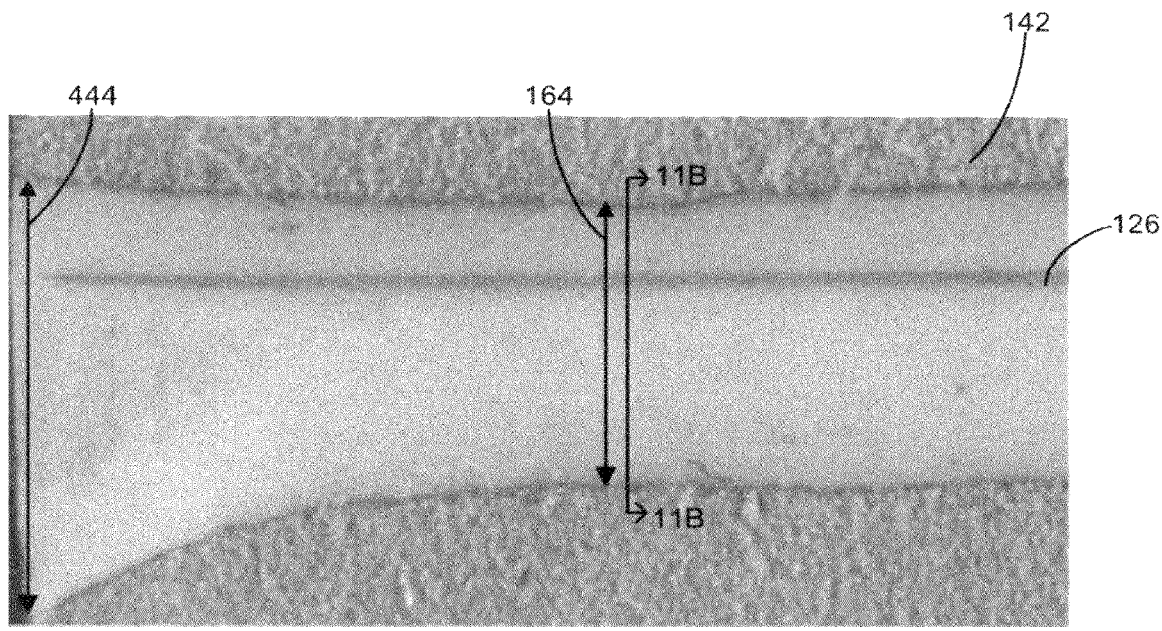
FIG. 11A is a top view of one example of a fiber adhered to a surface.
Figure 11B:
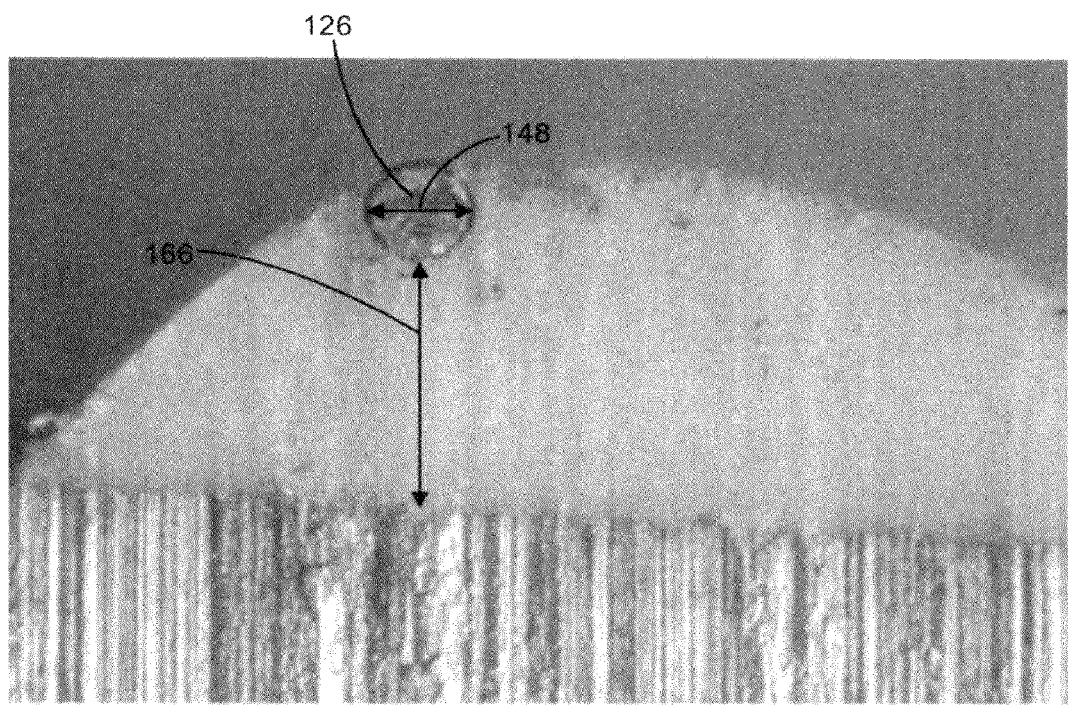
FIG. 11B is a cross-sectional view of the fiber of 11A, taken along line 11B-11B.

FIGS. 10A and 11A show an enlarged adhesive area toward the left side of the surface 142, which were created as application tool ran off outside the intended test area on the surface 142. Otherwise, it was noted that under generally steady state conditions, the particular fiber 126 tested tended to migrate toward the surface of the adhesive material, which is evident, for example in FIGS. 9B, 10B, 10C and 11B. This affected the distance 166 between the bonding side of the fiber 126 and the surface 142 (i.e. the thickness of the adhesive layer), which was, in FIGS. 9B, 10B, 10C and 11B, approximately 50 µm, 35 µm, 75 µm, and 330 µm, respectively. Such migration may be due to a buoyancy force created by an interaction between the adhesive (wetting) and cohesive properties of the adhesive, or may be because the fiber 126 comes out of the outlet port with an asymmetrical adhesive coating of this nature.

Figure 12A:
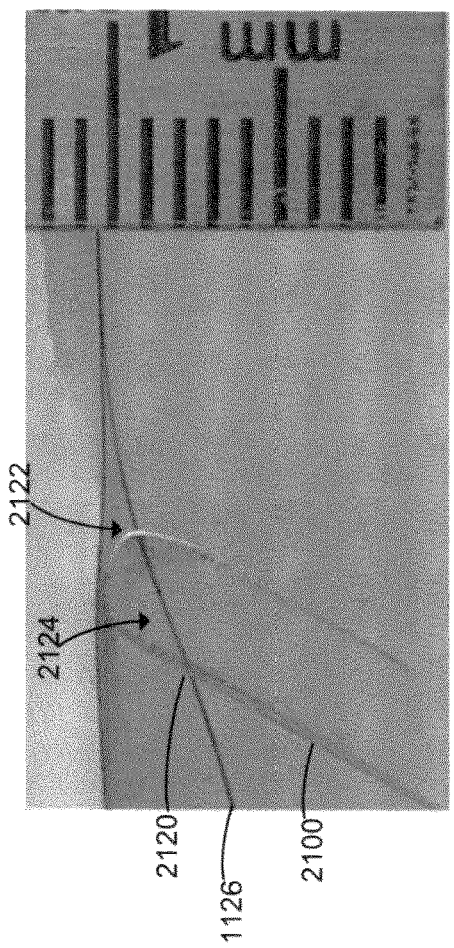
FIGS. 12A, 12B, 12C, and 12D are side views of examples of fibers bent at different angles to contact a surface.
Figure 12B:
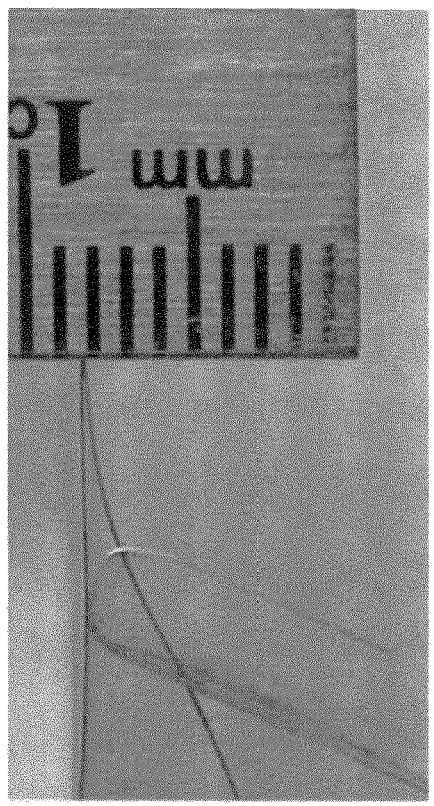
Figure 12C:
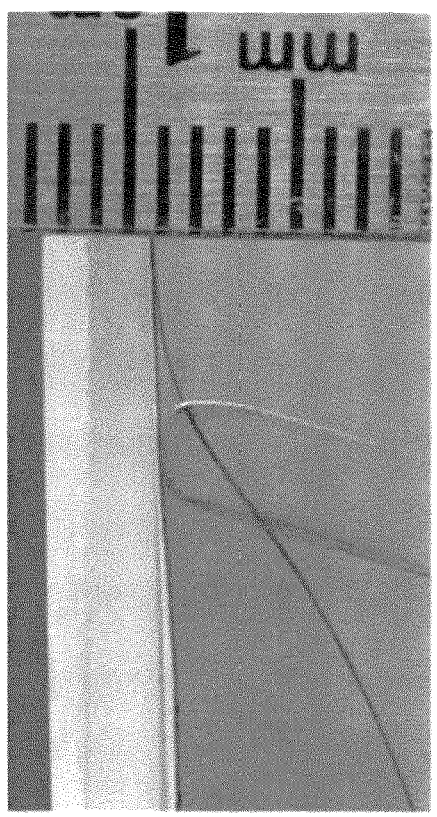
Figure 12D:
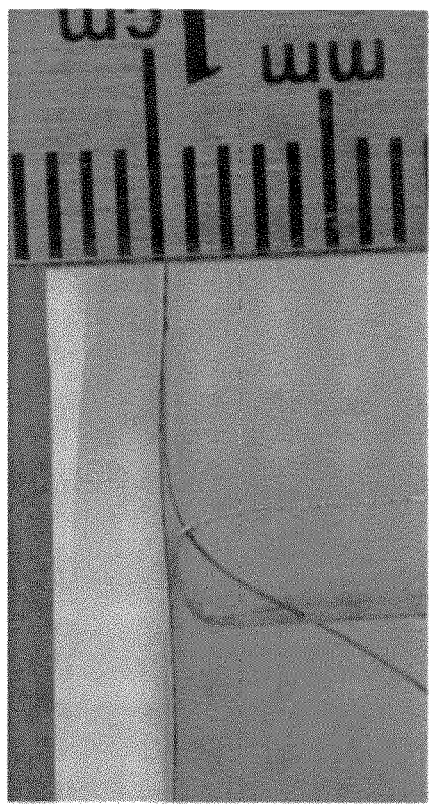

Another embodiment of an apparatus 2100 is illustrated in FIG. 12A. This test apparatus 2100 was fabricated from 0.005" thick brass shim stock by drilling a hole in the center of the plate to create an orifice to function as the fiber outlet port 2122, and bending the shim to a 90° angle at the orifice to form a corner that functioned as an open-topped adhesive reservoir 2124. Loctite® 1C® Hysol® two part epoxy adhesive was applied in the inside corner thus formed for mechanical protection. A fiber optic strand 126 with a diameter 148 of 125 µm was then pulled through a fiber inlet port 2120, through the adhesive reservoir 2124 and the outlet port 2122.

The test apparatus 2100 was oriented at different angles relative to the surface 142 to simulate different outlet angles, and the resulting bend radius of the fiber 126 created by the flexure of the fiber was observed. FIGS. 12A to 12D illustrate different bend radii that were observed, and correspond to outlet angles of approximately 18°, 25°, 33°, and 62° respectively. Based at least in part on this experiment, it was noted that providing an outlet angle of at least 35° was sufficient, for the given fiber 126 tested, to ensure that the fiber 126 was pressed against the surface 142, while keeping the bend radius within the stress limits of the fiber 126.

Another experiment was conducted to observe the effect that changing the offset distance 160 could have on the application of the fiber 126 to the surface 142. For this experiment, a test apparatus 3100 that is generally analogous to the apparatus 100 was created, and open to expose the travel path of the fiber 126 through the apparatus 2100. During these experiments the adhesive reservoir 3124 was empty. FIGS. 13A to 13F illustrate the travel path of the fiber 126 and bend radii observed using this experiment.

Figure 13B:
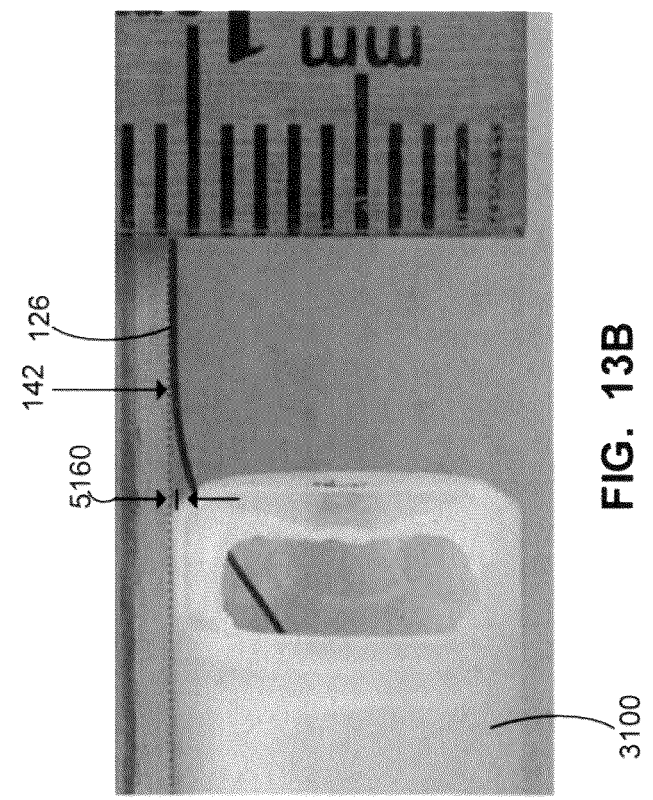
Figure 13A:
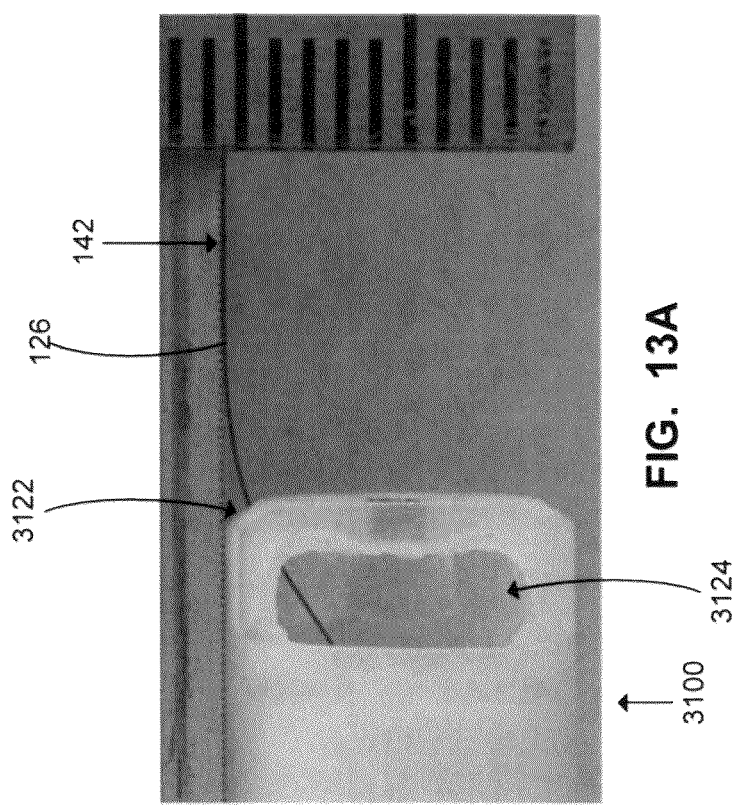
FIG. 13A is a side view of a fiber applied by an apparatus in contact with the surface.

FIGS. 13A and 13B illustrate the apparatus 3100 resting directly on the surface 142, and used in combination with a fiber 126 having a diameter of 125 µm in FIG. 13, and a fiber 126 having diameter of 210 µm in FIG. 13B. FIGS. 13C to 13F illustrate the apparatus 3100 used with a fiber 126 having diameter of 210 µm of spacers placed between the apparatus 3100 and the surface, thereby altering the offset distance 160. As shown in these figures, the apparatus 3100 can be used to apply the fiber 126 over a range of offset distances 160, extending up to at least 1 mm from the surface 142, and optionally more than 1 mm.

Optionally, the apparatus 100 may include one or more guides for individual fibers passing through the inlet port 134. For example, guides may be configured to help direct fibers 126 so that the exit the fiber outlet port 134 in a particular orientation (e.g. parallel to outlet axis 138) and are urged into contact with the bottom of the fibre outlet port 134 (i.e. the portion closest to the surface) such that the adhesive may tend to collect on the top of the fiber, as seen in FIG. 10B, instead of the fiber floating toward the top of the adhesive, as in FIG. 9B. In some embodiments, having the fiber 126 positioned relatively closer to the measurement surface may be preferable, and this may help improve accuracy of the measurements recorded using the fiber 126. Optionally, any of the apparatuses described herein may be configured so provide a greater quantity of adhesive on the exposed side 158 of the fiber than on the bonding side 156, such that the amount of adhesive positioned between the bonding side 156 of the fibers 126 and the surface is reduced. For example, the apparatuses may be configured so that the skimmer skims adhesive off of the bonding side 156 of the fiber 126 as it exits the apparatus. Reducing the volume of adhesive material between the bonding side 156 and the surface may help improve the effectiveness of the measurements obtained using the fiber 126.

Figure 17:
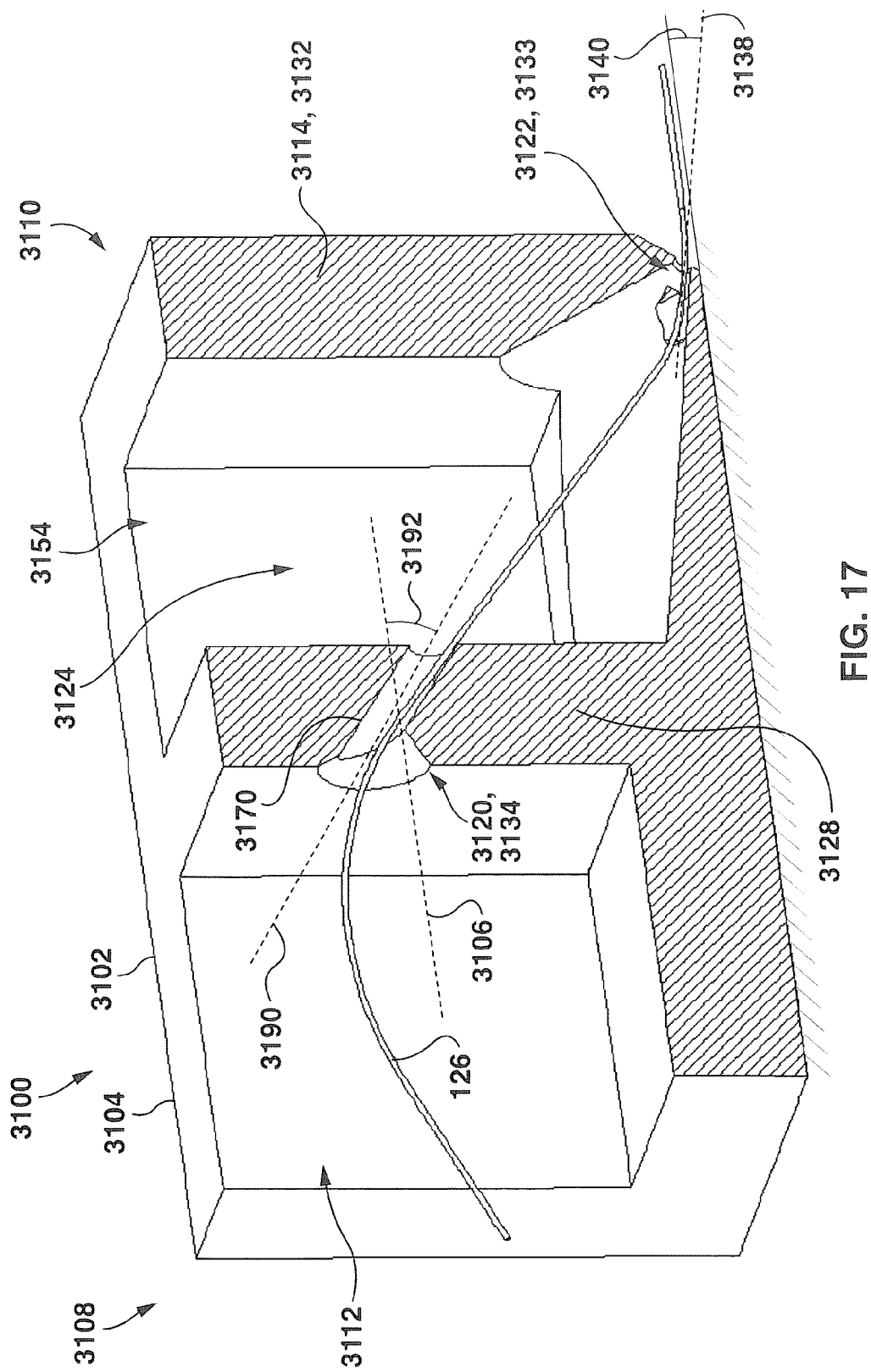
FIG. 17 is as a perspective, cross-sectional view of another example of an apparatus for adhering a fiber to a surface.
Figure 18:
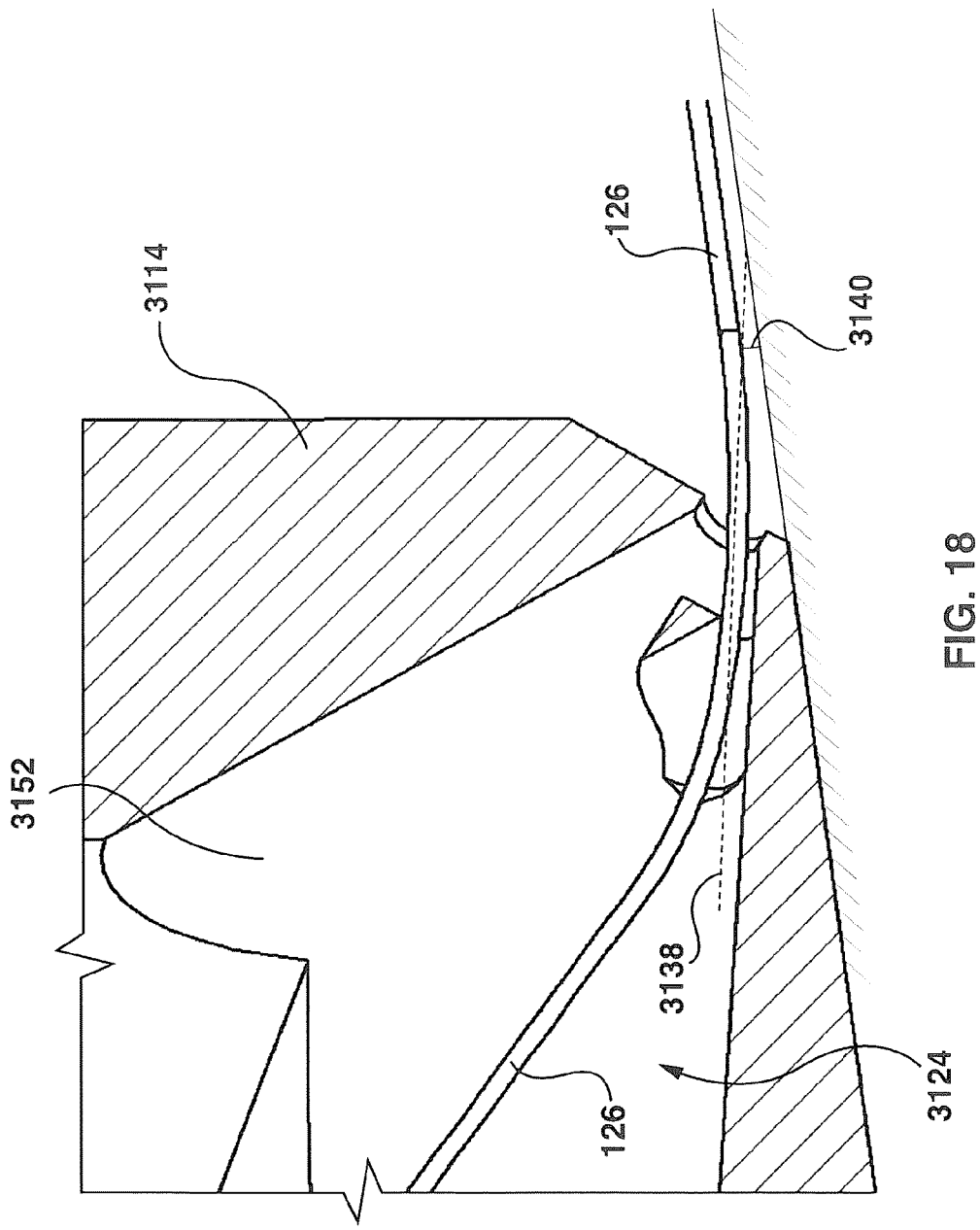
FIG. 18 is an enlarged view of a portion of the apparatus of FIG. 17.
Figure 19:
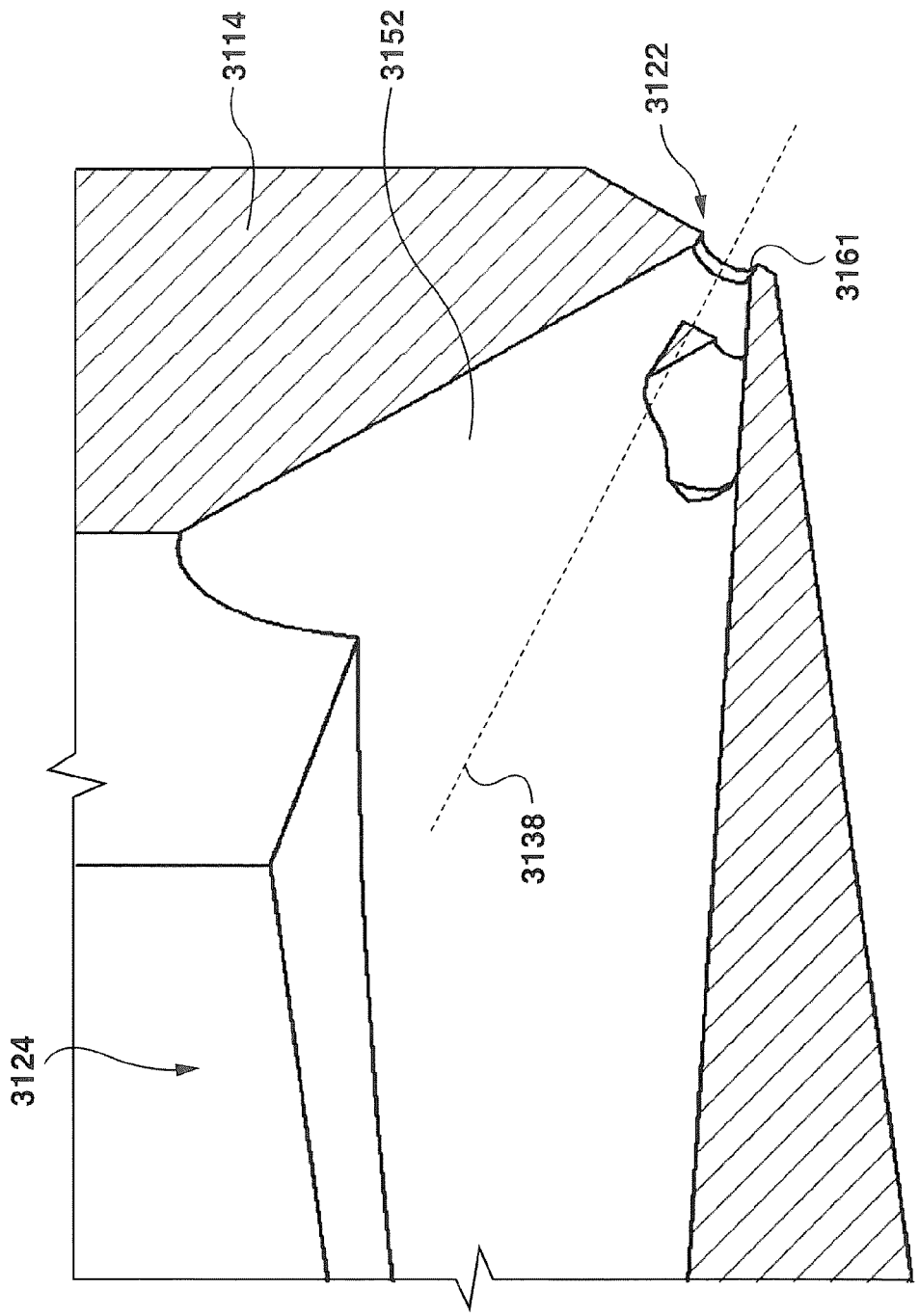
FIG. 19 is the enlarged view of FIG. 18 with the filament removed.

FIGS. 17-19 illustrate another example of an apparatus 3100 for adhering fibers to a surface includes a body 3102, a fiber inlet port 3120, one fiber outlet port 3122, with a metering passage 3152, and a reservoir chamber 3124. The apparatus 3100 is generally analogous to the apparatus 100, and like features are identified using like reference characters indexed by 3000.

In this embodiment, the body 3102 extends along a body axis 3106 between its first and second ends 3108 and 3110, but does not include the substantially hollow interior along its full length as shown in the apparatus 3100.

In this embodiment, the fiber inlet port 3120 also functions as the reservoir inlet port 3134, and is coincident therewith, and the reservoir outlet port 3133 is coincident with the fiber outlet port 3122.

In this embodiment, the apparatus is configured so that, a portion of the perimeter of the fiber outlet port 3122 that faces the bonding side 3158 of the fiber 126 may function as a skimmer 3161, to help limit thickness of the adhesive coating on the bonding side 156 by skimming off adhesive that will not fit through the gap and retaining it within the adhesive reservoir chamber 3124. In this example, the skimmer 3161 (FIG. 19) is a portion of the perimeter of the fiber outlet port 3122, but alternatively may be provided as a separate member, or as a portion of the body 3102 or other appropriate structure.

Optionally, to help facilitate the desired engagement between the fiber 126 and the skimmer 3161, the reservoir inlet port 3134 may be configured as a passage in the first end wall 3128 that extends along a passage axis 3190 that is inclined at an angle 3192 relative to the body axis 3106. The fiber guide surfaces 3170 are also aligned at the angle 3192 to help guide the fiber 126. In the illustrated embodiment, the projection of the passage axis 3190 does not intersect the fiber outlet port 3122 aperture, but does intersect a portion of the tapered metering passage 3150. Alternatively, the apparatus may be configured so that the axis 3190 intersects the fiber outlet port 3122 opening.

The location and orientation of the fiber guide surfaces 3170, in combination with the location and orientation of the outlet port 3122, metering passage 3155 and skimmer 3161 can help guide the fiber 126 through the apparatus 3100 at desired orientation to help facilitate the desired application and skimming of adhesives off the fiber 126.

In this embodiment, the angle 3140 of the outlet port axis 3138 (FIG. 18) is smaller than the angle in the apparatuses 100, 1100 and 2100.

In this embodiment the fiber guides 3170 deflects the fibre 126 in such a manner that the fibre 126 touches the bottom of the inside of the outlet port 3122 (at the skimmer 3161 portion that is closest to the surface), the same fibre 126 does not touch the opposite side of the inside of the outlet nozzle 3122 and forms a gap equal to the difference in the fiber diameter 148 and the outlet nozzle inside diameter. This configuration may help reduce the amount of glue/adhesive between the surface and the bonding side 156 fibre 126, while helping to ensure that a sufficient amount of adhesive is covering the fibre 126.

FIG. 20 shows a cross-sectional view of a fiber 126 adhered to a surface using the apparatus 3100. In this embodiment, the distance 166 between the bonding side of the fiber 126 and the surface 142 (i.e. the thickness of the adhesive layer), is approximately 50 μm.

While the above description provides examples of one or more apparatuses or methods, it will be appreciated that other apparatuses or methods may be within the scope of the accompanying claims.

We claim:

1. An apparatus for adhering a plurality of filaments to an inner surface of a hollow conduit, the apparatus comprising:
    a) a body having a filament inlet port, a plurality of filament outlet ports spaced apart from the filament inlet port, and a plurality of filament travel paths, each filament travel path extending between the filament inlet port and a respective one of the plurality of filament outlet ports;
    b) a reservoir chamber positioned within the body and forming a portion of each of the plurality of filament travel paths between the filament inlet port and each of the plurality of filament outlet ports, the reservoir chamber configured to contain a viscous adhesive material, and
wherein imparting relative axial movement between the body and the plurality of filaments extending through the plurality of filament travel paths urges the filaments along the filament travel paths and through the reservoir chamber so that each filament is coated with the viscous adhesive material when exiting via a respective one of the filament outlet ports, for adhesion to the inner surface.

2. The apparatus of claim 1, wherein the body is substantially cylindrical and extends along a body axis, and wherein the plurality of filament outlet ports are spaced apart from each other and arranged around the body axis.

3. The apparatus of claim 1, further comprising at least one filament guide provided along each filament travel path and within the reservoir chamber to guide each filament to exit the filament outlet port along a respective outlet port axis that is inclined relative to the body axis at an angle of between about 30 degrees and about 45 degrees.

4. An apparatus for adhering a filament to a surface, the apparatus comprising:
    a) a body having a filament inlet port, at least a first filament outlet port spaced apart from the filament inlet port, and at least a first filament travel path extending between the filament inlet port and the first filament outlet port, wherein the body extends along a body axis;
    b) a reservoir chamber positioned within the body and forming a portion of the first filament travel path between the filament inlet port and the first filament outlet port, the reservoir chamber configured to contain a viscous adhesive material, the reservoir chamber comprises a reservoir inlet port through which the filament can enter the reservoir and at least a first reservoir outlet port spaced apart from the reservoir inlet port through which the filament can exit the reservoir chamber and wherein the first reservoir outlet port is axially spaced apart from the reservoir inlet port and is offset from the reservoir inlet port in a lateral direction that is transverse to the body axis;
wherein imparting relative axial movement between the body and a first filament extending through the first filament travel path urges the first filament along the first filament travel path and through the reservoir chamber so that the first filament is coated with the viscous adhesive material when exiting via the first filament outlet port, for adhesion to the surface.

5. The apparatus of claim 4, wherein the body comprises at least a first end wall and a sidewall that extends axially from the first end wall, and wherein the filament outlet port is disposed in the sidewall.

6. The apparatus of claim 4, wherein the body extends along a body axis and wherein the filament outlet port extends along an outlet port axis, and wherein the outlet port axis is inclined relative to the body axis at an angle of between about 10 degrees and about 75 degrees.

7. The apparatus of claim 4, further comprising at least one filament guide provided in the first filament travel path between the fiber inlet port and the first filament outlet port to urge the filament into a particular orientation relative to the apparatus, wherein the filament guide is axially offset from the first filament outlet port and is disposed within the reservoir chamber.

8. The apparatus of claim 4, further comprising a second filament outlet port that is spaced apart from the first filament outlet port and a second filament travel path extending between the filament inlet port and the second filament outlet port and extending through the reservoir chamber, wherein imparting relative axial movement between the body and a second filament extending through the second filament travel path urges the second filament along the second filament travel path and through the reservoir chamber so that second filament is coated with the viscous adhesive material when exiting via the second filament outlet port.

9. The apparatus of claim 4, wherein the reservoir inlet port is sized to slidably receive the first filament in a non-sealed manner whereby the first filament physically contacts less than 100% of a perimeter of the reservoir inlet port.

10. The apparatus of claim 4, wherein the reservoir inlet port has an inlet port diameter that is at least 5% larger than a diameter of the first filament.

11. The apparatus of claim 4, wherein the reservoir chamber includes an adhesive inlet port that is in communication with the reservoir chamber through which the viscous adhesive material can be deposited into the reservoir chamber, the adhesive inlet port being spaced apart from the reservoir inlet port and the first reservoir outlet port and being disposed in a first end wall of the body or in a sidewall of the reservoir chamber.

12. The apparatus of claim 4, wherein the body is portable and is configured to translate relative to both the first filament and the surface along the length of first filament, whereby the first filament is drawn through the reservoir chamber and coated with the viscous adhesive material.

13. The apparatus of claim 4, wherein the first filament passes non-concentrically through the first filament outlet port so that the viscous adhesive material coats the first filament asymmetrically whereby an amount of the viscous adhesive on a bonding side of the first filament that engages the surface is less than an amount of the viscous adhesive on an opposing, outer side of the first filament.

* * * * *